US010725248B2

(12) United States Patent
Wong et al.

(10) Patent No.: US 10,725,248 B2
(45) Date of Patent: Jul. 28, 2020

(54) FIBER OPTIC RECEPTACLE WITH INTEGRATED DEVICE THEREIN INCORPORATING A BEHIND-THE-WALL FIBER OPTIC RECEPTACLE

(71) Applicant: Senko Advanced Components, Inc., Marlborough, MA (US)

(72) Inventors: Kim Man Wong, Kowloon (HK); Siu Kei Ma, Tuen Mun (HK); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/387,373

(22) Filed: Apr. 17, 2019

(65) Prior Publication Data

US 2019/0271816 A1    Sep. 5, 2019

Related U.S. Application Data

(63) Continuation-in-part of application No. 15/979,596, filed on May 15, 2018, now Pat. No. 10,416,394,
(Continued)

(51) Int. Cl.
*G02B 6/38* (2006.01)

(52) U.S. Cl.
CPC ......... *G02B 6/3869* (2013.01); *G02B 6/3825* (2013.01); *G02B 6/3893* (2013.01)

(58) Field of Classification Search
CPC ... G02B 6/3869; G02B 6/3825; G02B 6/3893
(Continued)

(56) References Cited

U.S. PATENT DOCUMENTS

| 4,150,790 A | 4/1979 | Otter |
| 4,327,964 A | 5/1982 | Haesley et al. |

(Continued)

FOREIGN PATENT DOCUMENTS

| CA | 2495693 A1 | 4/2004 |
| CN | 2836038 Y | 11/2006 |

(Continued)

OTHER PUBLICATIONS

International Search Report and Written Opinion, Application No. PCT/US19/27996, dated Aug. 26, 2019, pp. 15.

(Continued)

*Primary Examiner* — Alexander Gilman
(74) *Attorney, Agent, or Firm* — Edward S. Jarmolowicz, Esq.

(57) ABSTRACT

A fiber optic adapter for mating a multi-fiber optic ferrule connector and a multi-fiber optic connector. An engagement device may be integrated or molded as part of adapter receptacle at either end. The engagement device secures the multi-fiber connector. The adapter may be two-piece with a first portion detachable from a second portion, the first portion housing one or more integrated engagement devices and the second portion housing one or more replaceable engagement devices, or a receptacle configured to secure a latch configured on an outer housing of a connector. Receptacle may further contain a plural of engagement devices formed as a unitary engagement device. The receptacle has a gap configured to accept the integrated engagement device. A ferrule flange assembly configured to front load into a connector housing. A connector housing with a top and a bottom stabilizer for the fiber optic connector with an adapter port.

1 Claim, 41 Drawing Sheets

Related U.S. Application Data which is a continuation-in-part of application No. 15/881,309, filed on Jan. 26, 2018, now Pat. No. 10,185,100.

(60) Provisional application No. 62/658,806, filed on Apr. 17, 2018, provisional application No. 62/581,961, filed on Nov. 6, 2017, provisional application No. 62/546,920, filed on Aug. 17, 2017, provisional application No. 62/457,150, filed on Feb. 9, 2017, provisional application No. 62/452,147, filed on Jan. 30, 2017.

(58) Field of Classification Search
USPC .................................................... 439/79
See application file for complete search history.

(56) References Cited

U.S. PATENT DOCUMENTS

| | | | | |
|---|---|---|---|---|
| 4,478,473 | A | 10/1984 | Frear | |
| 4,762,388 | A | 8/1988 | Tanaka et al. | |
| 4,764,129 | A | 8/1988 | Jones et al. | |
| 4,840,451 | A | 6/1989 | Sampson et al. | |
| 4,872,736 | A | 10/1989 | Myers et al. | |
| 4,979,792 | A | 12/1990 | Weber et al. | |
| 5,041,025 | A | 8/1991 | Haitmanek | |
| D323,143 | S | 1/1992 | Ohkura et al. | |
| 5,212,752 | A | 5/1993 | Stephenson et al. | |
| 5,265,181 | A | 11/1993 | Chang | |
| 5,289,554 | A | 2/1994 | Cubukciyan et al. | |
| 5,317,663 | A | 5/1994 | Beard et al. | |
| 5,335,301 | A | 5/1994 | Newman et al. | |
| 5,348,487 | A | 9/1994 | Marazzi et al. | |
| 5,444,806 | A | 8/1995 | deMarchi et al. | |
| 5,481,634 | A | 1/1996 | Anderson et al. | |
| 5,506,922 | A | 4/1996 | Grois et al. | |
| 5,521,997 | A | 5/1996 | Rovenolt et al. | |
| 5,570,445 | A | 10/1996 | Chou et al. | |
| 5,588,079 | A | 12/1996 | Tanabe et al. | |
| 5,684,903 | A | 11/1997 | Kyomasu et al. | |
| 5,687,268 | A | 11/1997 | Stephenson et al. | |
| 5,781,681 | A | 7/1998 | Manning | |
| 5,887,095 | A * | 3/1999 | Nagase | G02B 6/3825 385/147 |
| 5,937,130 | A | 8/1999 | Amberg et al. | |
| 5,956,444 | A | 9/1999 | Duda et al. | |
| 5,971,626 | A | 10/1999 | Knodell et al. | |
| 6,041,155 | A | 3/2000 | Anderson et al. | |
| 6,049,040 | A | 4/2000 | Biles et al. | |
| 6,134,370 | A | 10/2000 | Childers et al. | |
| 6,178,283 | B1 | 1/2001 | Weigel | |
| 6,193,420 | B1 * | 2/2001 | Sikorski, Jr. | G02B 6/3825 174/67 |
| RE37,080 | E | 3/2001 | Stephenson et al. | |
| 6,206,577 | B1 | 3/2001 | Hall, III et al. | |
| 6,206,581 | B1 | 3/2001 | Driscoll et al. | |
| 6,227,717 | B1 | 5/2001 | Ott et al. | |
| 6,238,104 | B1 | 5/2001 | Yamakawa et al. | |
| 6,247,849 | B1 | 6/2001 | Liu | |
| 6,364,537 | B1 * | 4/2002 | Maynard | G02B 6/3831 385/55 |
| 6,447,170 | B1 | 9/2002 | Takahashi et al. | |
| 6,461,054 | B1 | 10/2002 | Iwase | |
| 6,471,412 | B1 | 10/2002 | Belenkiy et al. | |
| 6,471,414 | B2 * | 10/2002 | Carberry | G02B 6/3807 385/134 |
| 6,478,472 | B1 | 11/2002 | Anderson et al. | |
| 6,551,117 | B2 | 4/2003 | Poplawski et al. | |
| 6,579,014 | B2 | 6/2003 | Melton et al. | |
| 6,634,801 | B1 | 10/2003 | Waldron et al. | |
| 6,648,520 | B2 | 11/2003 | McDonald et al. | |
| 6,682,228 | B2 * | 1/2004 | Rathnam | G02B 6/3825 385/55 |
| 6,685,362 | B2 * | 2/2004 | Burkholder | G02B 6/3825 385/78 |
| 6,695,486 | B1 | 2/2004 | Falkenberg | |
| 6,854,894 | B1 | 2/2005 | Yunker et al. | |
| 6,872,039 | B2 | 3/2005 | Baus et al. | |
| 6,935,789 | B2 * | 8/2005 | Gross, III | G02B 6/3847 385/59 |
| 7,008,117 | B2 | 3/2006 | Kiani et al. | |
| 7,091,421 | B2 | 5/2006 | Kukita et al. | |
| 7,090,406 | B2 | 8/2006 | Melton et al. | |
| 7,090,407 | B2 | 8/2006 | Melton et al. | |
| 7,111,990 | B2 | 9/2006 | Melton et al. | |
| 7,113,679 | B2 | 9/2006 | Melton et al. | |
| 7,114,984 | B2 | 10/2006 | Shirk et al. | |
| D533,504 | S | 12/2006 | Lee | |
| D534,124 | S | 12/2006 | Taguchi | |
| 7,150,567 | B1 | 12/2006 | Luther et al. | |
| 7,153,041 | B2 | 12/2006 | Mine et al. | |
| 7,198,409 | B2 | 4/2007 | Smith et al. | |
| 7,207,724 | B2 | 4/2007 | Gurreri | |
| D543,146 | S | 5/2007 | Chen et al. | |
| 7,258,493 | B2 | 8/2007 | Milette | |
| 7,281,859 | B2 | 10/2007 | Mudd et al. | |
| D558,675 | S | 1/2008 | Chien et al. | |
| 7,315,682 | B1 | 1/2008 | En Lin et al. | |
| 7,325,976 | B2 | 2/2008 | Gurreri et al. | |
| 7,325,980 | B2 * | 2/2008 | Pepe | G02B 6/3879 385/55 |
| 7,329,137 | B2 | 2/2008 | Martin et al. | |
| 7,331,718 | B2 | 2/2008 | Yazaki et al. | |
| 7,354,291 | B2 | 4/2008 | Caveney et al. | |
| 7,371,082 | B2 * | 5/2008 | Zimmel | G02B 6/3871 439/78 |
| 7,387,447 | B2 | 6/2008 | Mudd et al. | |
| 7,390,203 | B2 | 6/2008 | Murano et al. | |
| D572,661 | S | 7/2008 | En Lin et al. | |
| 7,431,604 | B2 | 10/2008 | Waters et al. | |
| 7,463,803 | B2 | 12/2008 | Cody et al. | |
| 7,465,180 | B2 | 12/2008 | Kusuda et al. | |
| 7,507,103 | B2 | 3/2009 | Phillips et al. | |
| 7,510,335 | B1 | 3/2009 | Su et al. | |
| 7,513,695 | B1 | 4/2009 | Lin et al. | |
| 7,561,775 | B2 | 7/2009 | Lin et al. | |
| 7,591,595 | B2 | 9/2009 | Lu et al. | |
| 7,594,766 | B1 | 9/2009 | Sasser et al. | |
| 7,641,398 | B2 | 1/2010 | O'Riorden et al. | |
| 7,651,361 | B2 | 1/2010 | Henry et al. | |
| 7,695,199 | B2 | 4/2010 | Teo et al. | |
| 7,699,533 | B2 | 4/2010 | Milette | |
| 7,785,018 | B2 | 8/2010 | Jones et al. | |
| 7,824,113 | B2 * | 11/2010 | Wong | G02B 6/387 385/53 |
| 7,837,395 | B2 * | 11/2010 | Lin | G02B 6/3825 385/134 |
| D641,708 | S | 7/2011 | Yamauchi | |
| 8,083,450 | B1 * | 12/2011 | Smith | F16B 37/044 411/112 |
| 8,186,890 | B2 | 5/2012 | Lu | |
| 8,192,091 | B2 | 6/2012 | Hsu et al. | |
| 8,202,009 | B2 * | 6/2012 | Lin | G02B 6/3825 385/55 |
| 8,251,733 | B2 | 8/2012 | Wu | |
| 8,267,595 | B2 * | 9/2012 | Lin | G02B 6/3825 385/55 |
| 8,270,796 | B2 | 9/2012 | Nhep | |
| 8,408,815 | B2 | 4/2013 | Lin et al. | |
| 8,444,327 | B2 * | 5/2013 | Chen | G02B 6/3825 385/75 |
| 8,465,317 | B2 | 6/2013 | Gniadek et al. | |
| 8,556,645 | B2 | 10/2013 | Crain | |
| 8,636,424 | B2 | 1/2014 | Kuffel et al. | |
| 8,651,749 | B2 | 2/2014 | Dainese Junior et al. | |
| 8,734,027 | B2 * | 5/2014 | Zoss | G02B 6/3825 385/139 |
| 8,770,863 | B2 | 7/2014 | Cooke et al. | |
| 8,899,845 | B2 * | 12/2014 | Gallegos | G02B 6/3826 385/81 |

(56) References Cited

U.S. PATENT DOCUMENTS

| | | | |
|---|---|---|---|
| 8,998,505 B2* | 4/2015 | Motofuji | G02B 6/3879 385/78 |
| 9,188,747 B2 | 11/2015 | Gniadek | |
| 9,261,654 B2* | 2/2016 | Murphy | G02B 6/3825 |
| 9,297,962 B2* | 3/2016 | Lee | G02B 6/3825 |
| 9,310,569 B2* | 4/2016 | Lee | G02B 6/3825 |
| 9,411,110 B2 | 8/2016 | Barnette et al. | |
| 9,494,744 B2 | 11/2016 | de Jong | |
| 9,548,557 B2 | 1/2017 | Liu | |
| 9,551,842 B2 | 1/2017 | Theuerkorn | |
| 9,568,686 B2 | 2/2017 | Fewkes et al. | |
| 9,581,768 B1 | 2/2017 | Baca et al. | |
| 9,588,305 B2* | 3/2017 | Seki | G02B 6/3893 |
| 9,599,778 B2* | 3/2017 | Wong | G02B 6/3893 |
| 9,618,702 B2* | 4/2017 | Takano | G02B 6/3825 |
| 9,684,313 B2 | 6/2017 | Cline et al. | |
| 9,709,753 B1 | 7/2017 | Chang et al. | |
| 9,726,830 B1 | 8/2017 | Gniadek | |
| 9,739,955 B2* | 8/2017 | Lee | G02B 6/3893 |
| 9,869,825 B2* | 1/2018 | Bailey | G02B 6/3879 |
| 9,927,582 B2 | 3/2018 | Chang et al. | |
| 10,101,539 B2 | 10/2018 | Yang et al. | |
| 10,185,099 B2* | 1/2019 | Chang | G02B 6/3825 |
| 10,228,521 B2* | 3/2019 | Gniadek | H01R 13/6271 |
| 10,295,755 B1* | 5/2019 | Zhou | G02B 6/3825 |
| 10,302,874 B2* | 5/2019 | Tong | G02B 6/38 |
| 10,302,875 B1* | 5/2019 | Yang | G02B 6/3874 |
| 10,444,444 B2* | 10/2019 | Ma | G02B 6/3893 |
| 10,520,689 B2* | 12/2019 | Gniadek | H01R 13/6271 |
| 2002/0159712 A1 | 10/2002 | Holmquist | G02B 6/3825 385/70 |
| 2002/0172467 A1* | 11/2002 | Anderson | G02B 6/3825 385/53 |
| 2003/0053787 A1 | 3/2003 | Lee | |
| 2003/0063862 A1* | 4/2003 | Fillion | G02B 6/3825 385/53 |
| 2003/0157825 A1* | 8/2003 | Kane | H01R 13/641 439/352 |
| 2004/0052473 A1 | 3/2004 | Seo et al. | |
| 2004/0136657 A1 | 7/2004 | Ngo | |
| 2004/0141693 A1 | 7/2004 | Szilagyi et al. | |
| 2004/0161958 A1 | 8/2004 | Togami et al. | |
| 2004/0234209 A1 | 11/2004 | Cox et al. | |
| 2005/0111796 A1 | 5/2005 | Matasek et al. | |
| 2005/0141817 A1 | 6/2005 | Yazaki et al. | |
| 2006/0089049 A1 | 4/2006 | Sedor | |
| 2006/0127025 A1 | 6/2006 | Haberman | |
| 2006/0160429 A1* | 7/2006 | Dawiedczyk | H01R 12/7005 439/676 |
| 2006/0269194 A1 | 11/2006 | Luther et al. | |
| 2006/0274411 A1 | 12/2006 | Yamauchi | |
| 2007/0028409 A1 | 2/2007 | Yamada | |
| 2007/0079854 A1 | 4/2007 | You | |
| 2007/0098329 A1* | 5/2007 | Shimoji | G02B 6/3893 385/76 |
| 2007/0149062 A1 | 6/2007 | Long et al. | |
| 2007/0232115 A1* | 10/2007 | Burke | H01R 13/6272 439/344 |
| 2007/0243749 A1 | 10/2007 | Wu | |
| 2008/0008430 A1 | 1/2008 | Kewitsch | |
| 2008/0044137 A1 | 2/2008 | Luther et al. | |
| 2008/0056646 A1* | 3/2008 | Terakura | G02B 6/3831 385/72 |
| 2008/0069501 A1* | 3/2008 | Mudd | G02B 6/3825 385/75 |
| 2008/0101757 A1 | 5/2008 | Lin et al. | |
| 2008/0226237 A1 | 9/2008 | O'Riorden et al. | |
| 2008/0267566 A1* | 10/2008 | En Lin | G02B 6/3825 385/53 |
| 2009/0022457 A1 | 1/2009 | De Jong et al. | |
| 2009/0028507 A1* | 1/2009 | Jones | G02B 6/3825 385/56 |
| 2009/0092360 A1 | 4/2009 | Lin et al. | |
| 2009/0175580 A1* | 7/2009 | Chen | G02B 6/3817 385/75 |
| 2009/0196555 A1 | 8/2009 | Lin et al. | |
| 2009/0214162 A1 | 8/2009 | O'Riorden et al. | |
| 2009/0220197 A1 | 9/2009 | Gniadek | |
| 2009/0290838 A1 | 11/2009 | Lin et al. | |
| 2009/0290938 A1 | 11/2009 | Lin et al. | |
| 2010/0034502 A1 | 2/2010 | Lu et al. | |
| 2010/0247041 A1 | 9/2010 | Szilagyi | |
| 2010/0322561 A1* | 12/2010 | Lin | G02B 6/3825 385/55 |
| 2011/0044583 A1* | 2/2011 | Dalton | G02B 6/3825 385/53 |
| 2011/0044588 A1 | 2/2011 | Larson et al. | |
| 2011/0045683 A1 | 2/2011 | Foung | |
| 2011/0131801 A1 | 6/2011 | Nelson et al. | |
| 2011/0177710 A1 | 7/2011 | Tobey | |
| 2011/0274437 A1* | 11/2011 | Jones | G02B 6/3879 398/141 |
| 2012/0099822 A1 | 4/2012 | Kuffel et al. | |
| 2012/0155810 A1* | 6/2012 | Nakagawa | G02B 6/3878 385/78 |
| 2012/0189260 A1 | 7/2012 | Kowalczyk et al. | |
| 2012/0269485 A1* | 10/2012 | Haley | G02B 6/3887 385/78 |
| 2012/0301080 A1 | 11/2012 | Gniadek | |
| 2013/0071067 A1* | 3/2013 | Lin | G02B 6/3825 385/75 |
| 2013/0089995 A1* | 4/2013 | Gniadek | H01R 13/6335 439/152 |
| 2013/0094816 A1 | 4/2013 | Lin et al. | |
| 2013/0121653 A1 | 5/2013 | Shitama et al. | |
| 2013/0183012 A1 | 7/2013 | Cabanne Lopez et al. | |
| 2013/0183018 A1* | 7/2013 | Holmberg | G02B 6/3825 385/135 |
| 2013/0195407 A1* | 8/2013 | Imaki | G02B 6/36 385/84 |
| 2013/0216188 A1* | 8/2013 | Lin | G02B 6/3893 385/77 |
| 2013/0259429 A1 | 10/2013 | Czosnowski et al. | |
| 2013/0322825 A1 | 12/2013 | Cooke et al. | |
| 2014/0016901 A1* | 1/2014 | Lambourn | G02B 6/3895 385/75 |
| 2014/0016902 A1* | 1/2014 | Pepe | G02B 6/3893 385/76 |
| 2014/0023322 A1* | 1/2014 | Gniadek | G02B 6/3825 385/56 |
| 2014/0050446 A1 | 2/2014 | Chang | |
| 2014/0133808 A1* | 5/2014 | Hill | G02B 6/3826 385/81 |
| 2014/0169727 A1* | 6/2014 | Veatch | G02B 6/2726 385/11 |
| 2014/0219621 A1 | 8/2014 | Barnette et al. | |
| 2014/0226946 A1 | 8/2014 | Cook et al. | |
| 2014/0241678 A1 | 8/2014 | Brinquier et al. | |
| 2014/0241688 A1 | 8/2014 | Isenhour et al. | |
| 2014/0334780 A1 | 11/2014 | Nguyen et al. | |
| 2014/0348477 A1 | 11/2014 | Chang | |
| 2015/0177463 A1* | 6/2015 | Lee | G02B 6/3897 385/76 |
| 2015/0301294 A1 | 10/2015 | Chang | |
| 2015/0355417 A1 | 10/2015 | Takano | |
| 2015/0331201 A1 | 11/2015 | Takano et al. | |
| 2015/0378113 A1 | 12/2015 | Good et al. | |
| 2016/0131849 A1* | 5/2016 | Takano | G02B 6/3825 385/60 |
| 2016/0131858 A1 | 5/2016 | Anderson et al. | |
| 2016/0154190 A1* | 6/2016 | Lin | G02B 6/3893 385/76 |
| 2016/0172852 A1 | 6/2016 | Takano | |
| 2016/0291262 A1 | 6/2016 | Chang | |
| 2016/0195682 A1 | 7/2016 | Takano | |
| 2016/0259135 A1* | 9/2016 | Gniadek | G02B 6/3885 |
| 2016/0266326 A1 | 9/2016 | Gniadek | |
| 2016/0320572 A1 | 11/2016 | Gniadek | |
| 2017/0003458 A1 | 1/2017 | Gniadek | |
| 2017/0276881 A1* | 9/2017 | Ott | G02B 6/3825 |

(56) References Cited

U.S. PATENT DOCUMENTS

| | | | |
|---|---|---|---|
| 2018/0259717 A1* | 9/2018 | Takano | G02B 6/3893 |
| 2018/0292618 A1 | 10/2018 | Chang et al. | |
| 2019/0195407 A1* | 6/2019 | Sprenger | F16L 37/08 |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Mar. 3, 2015 for EP 14187661.
European Search Report and Written Opinion dated Feb. 19, 2015 for EP 14168005.
"Fiber Optic Connectors and Assemblies Catalog" 2009, Huber & Suhner Fiver Optics, Herisau, Switzerland, www.hubersuhner.com.
"Fiber Optic Interconnect Solutions, Tactical Fiber Optical Connectors, Cables and Termini" 2006, Glenair, Inc., Glendale, California, www.mps-electronics.de.
"Fiber Optic Products Catalog" Nov. 2007, Tyco Electronics Corporation, Harrisburg, Pennsylvania, www.ampnetconnect.com.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Oct. 9, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Aug. 22, 2016 from related International Application No. PCT/US2015/059458, International Filing Date Nov. 6, 2015.
International Search Report (ISR) WO2008112986 dated Sep. 15, 2009.
ISR WO2014028527ISR dated Feb. 20, 2014.
ISR WO2015US57610ISR dated Jan. 21, 2016.
Non-Final Office Action, U.S. Appl. No. 15/882,343, dated Nov. 19, 2018, pp. 12.
Non-Final Office Action, U.S. Appl. No. 15/979,596, dated Dec. 11, 2018, pp. 10.

* cited by examiner

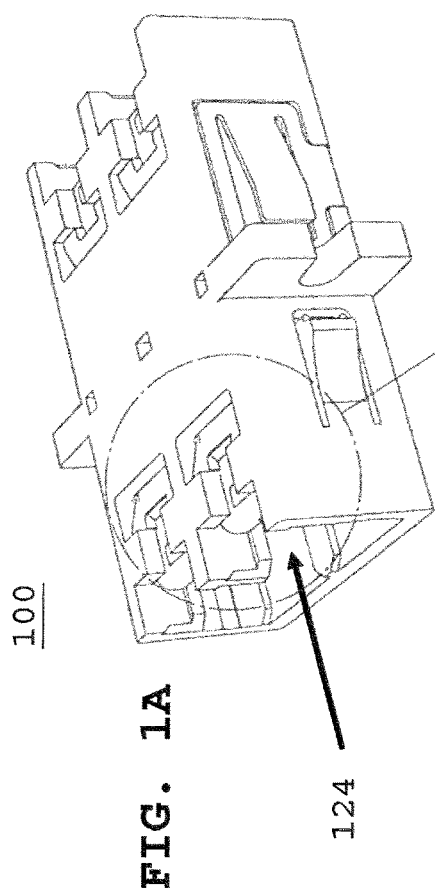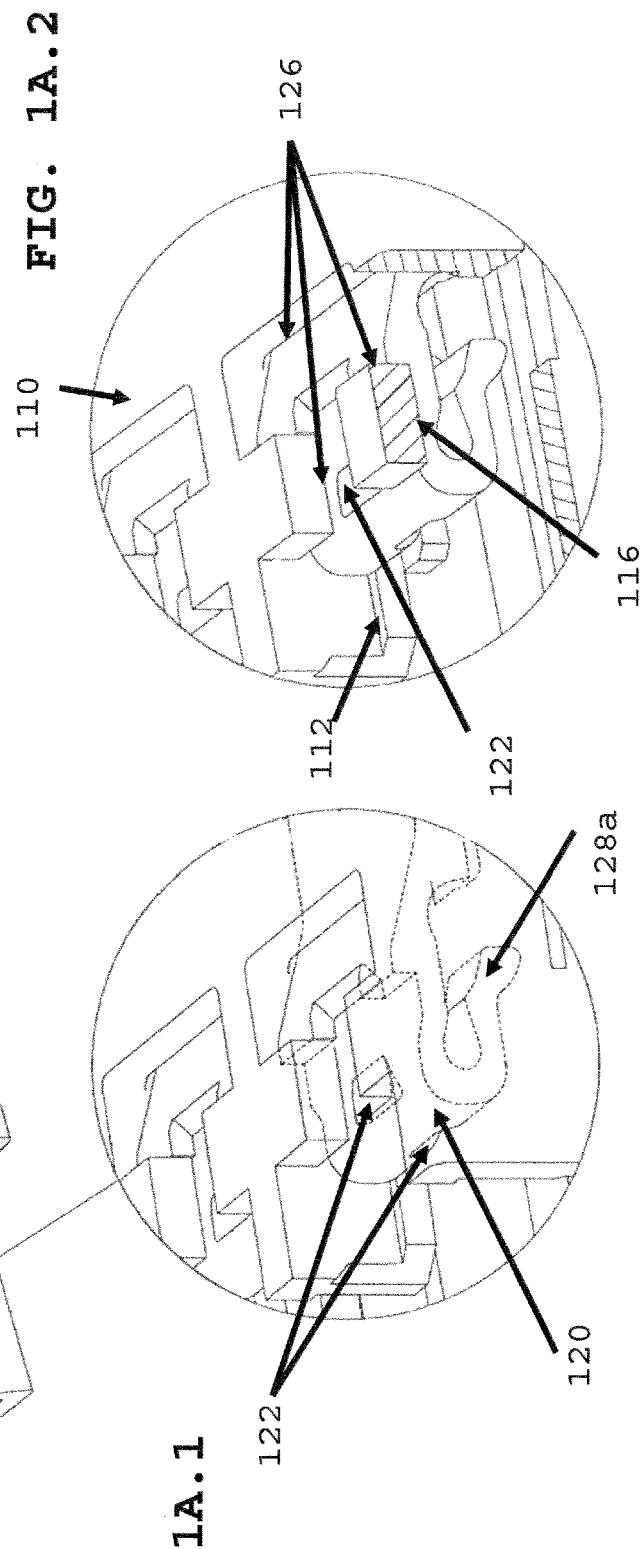

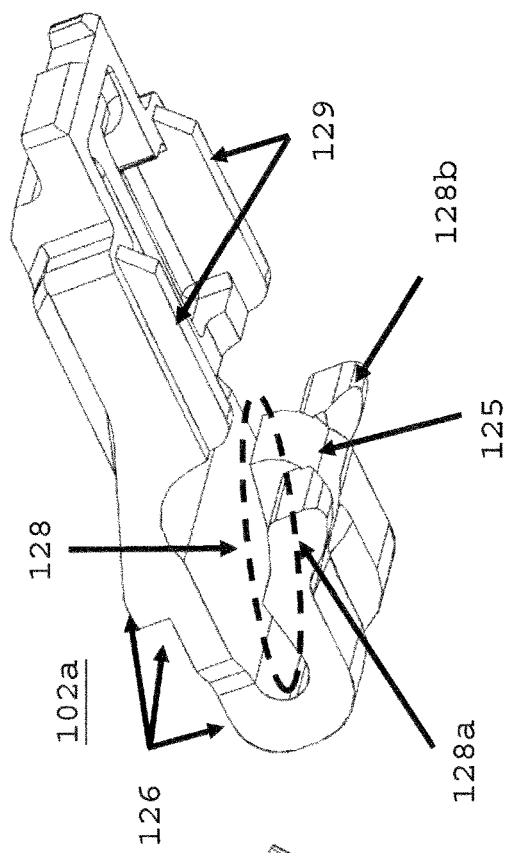
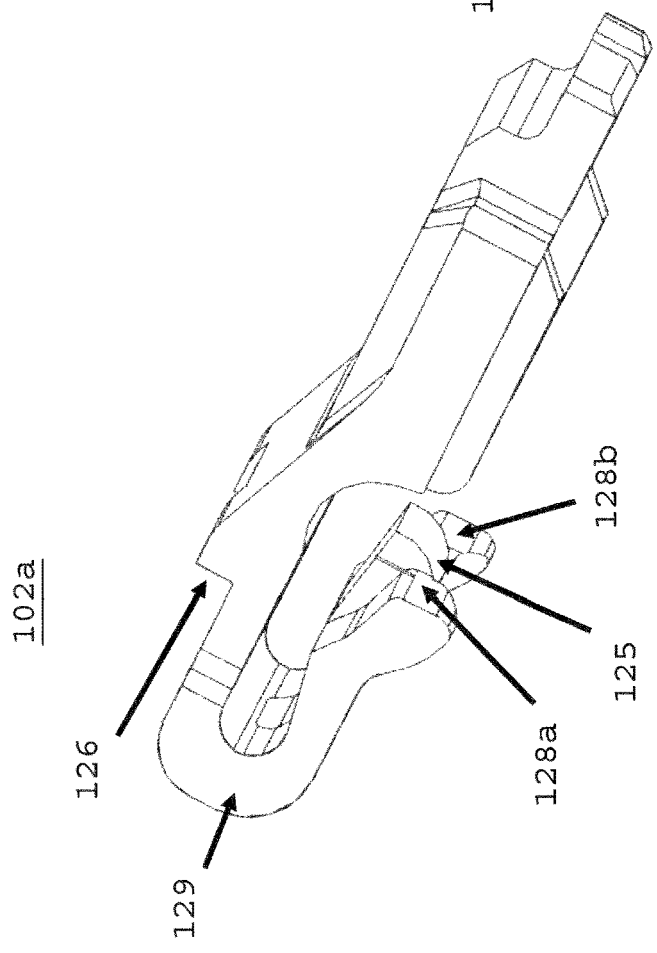

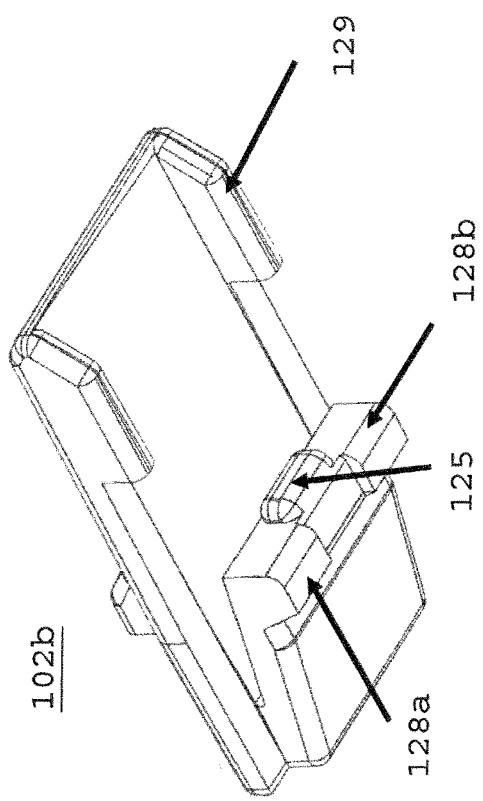
FIG. 1C.1
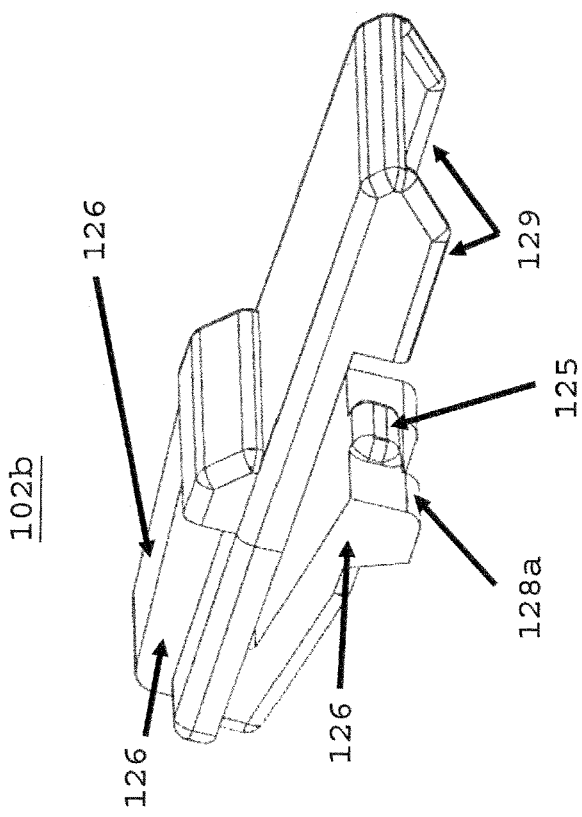
FIG. 1C

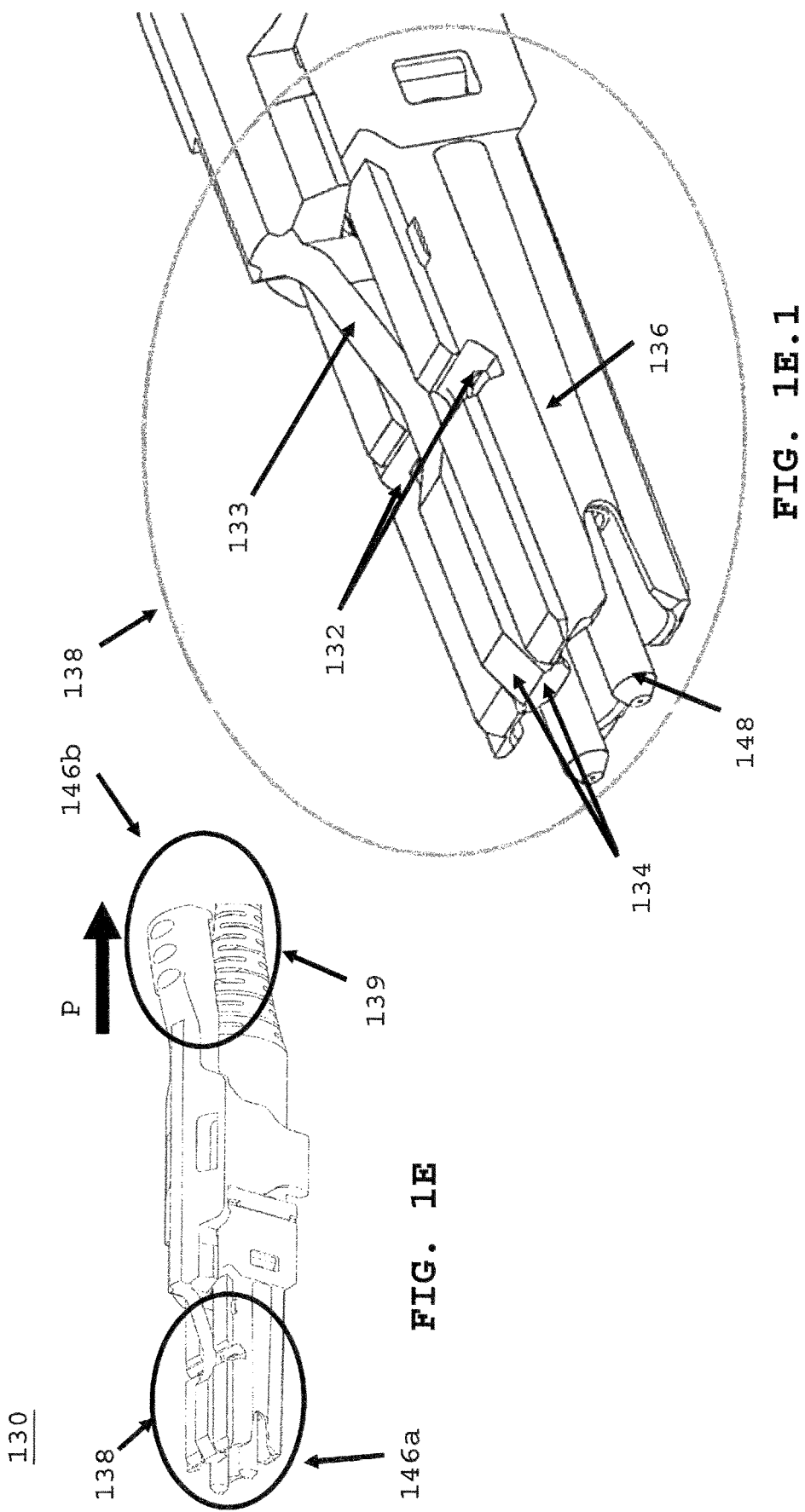

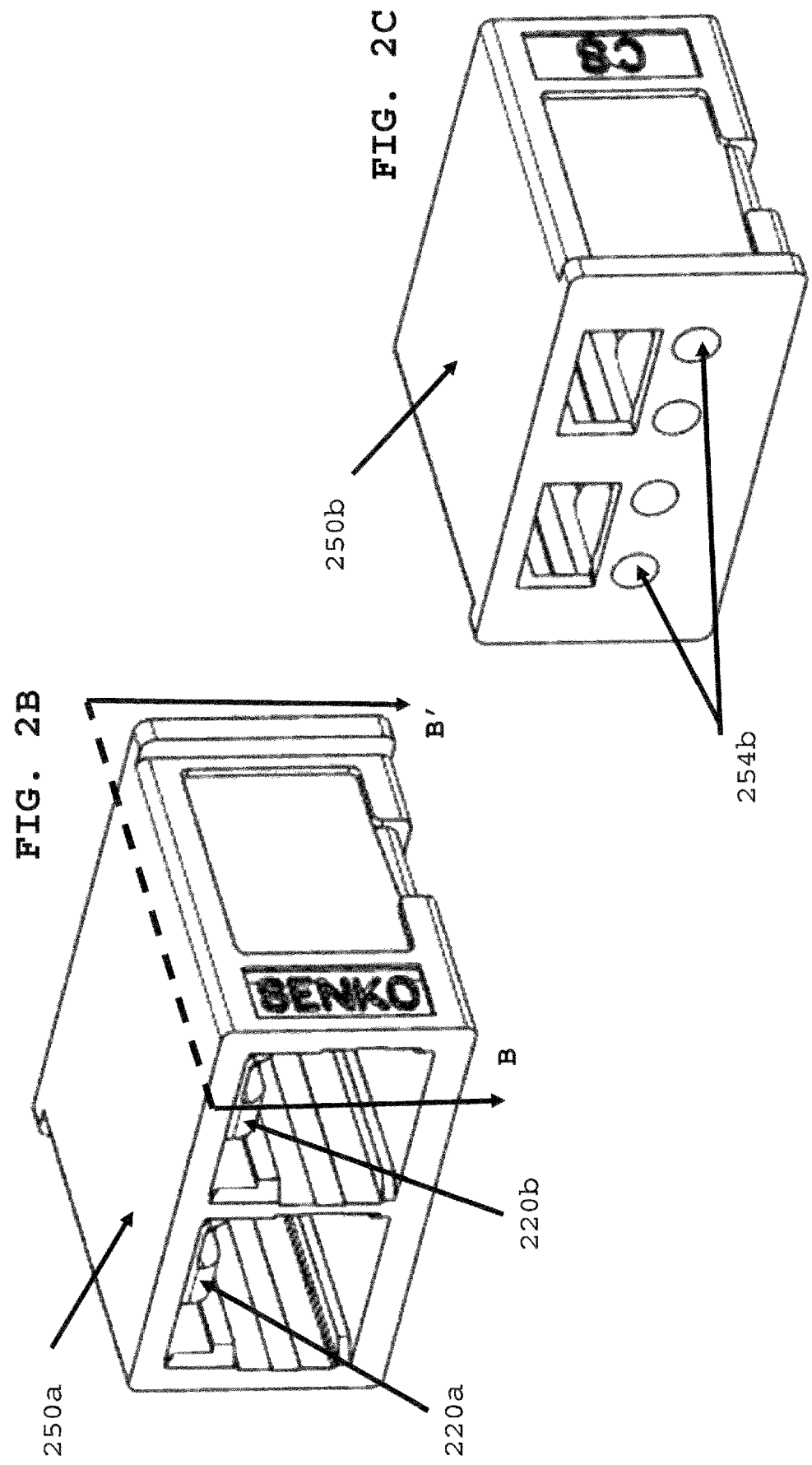

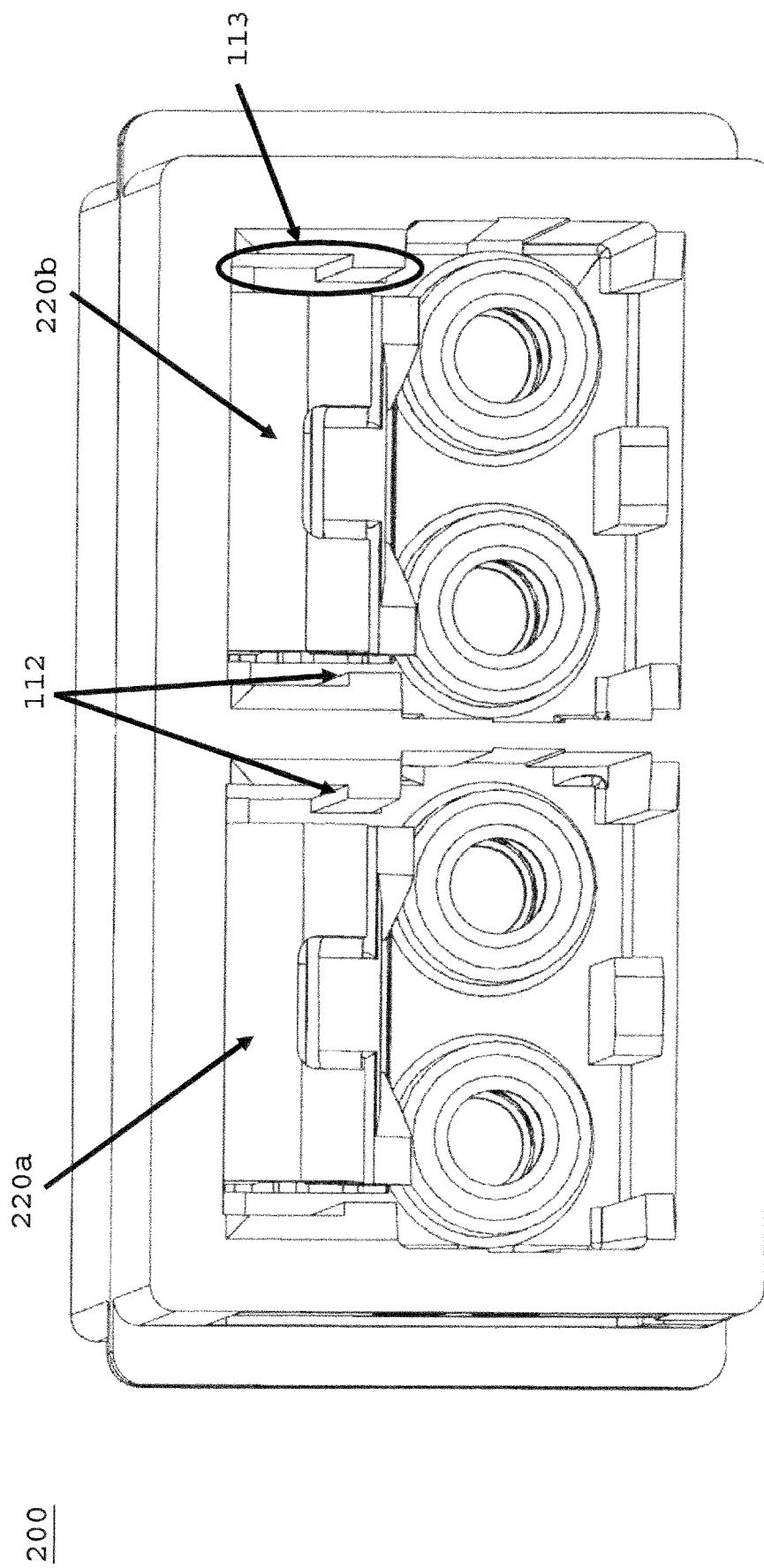

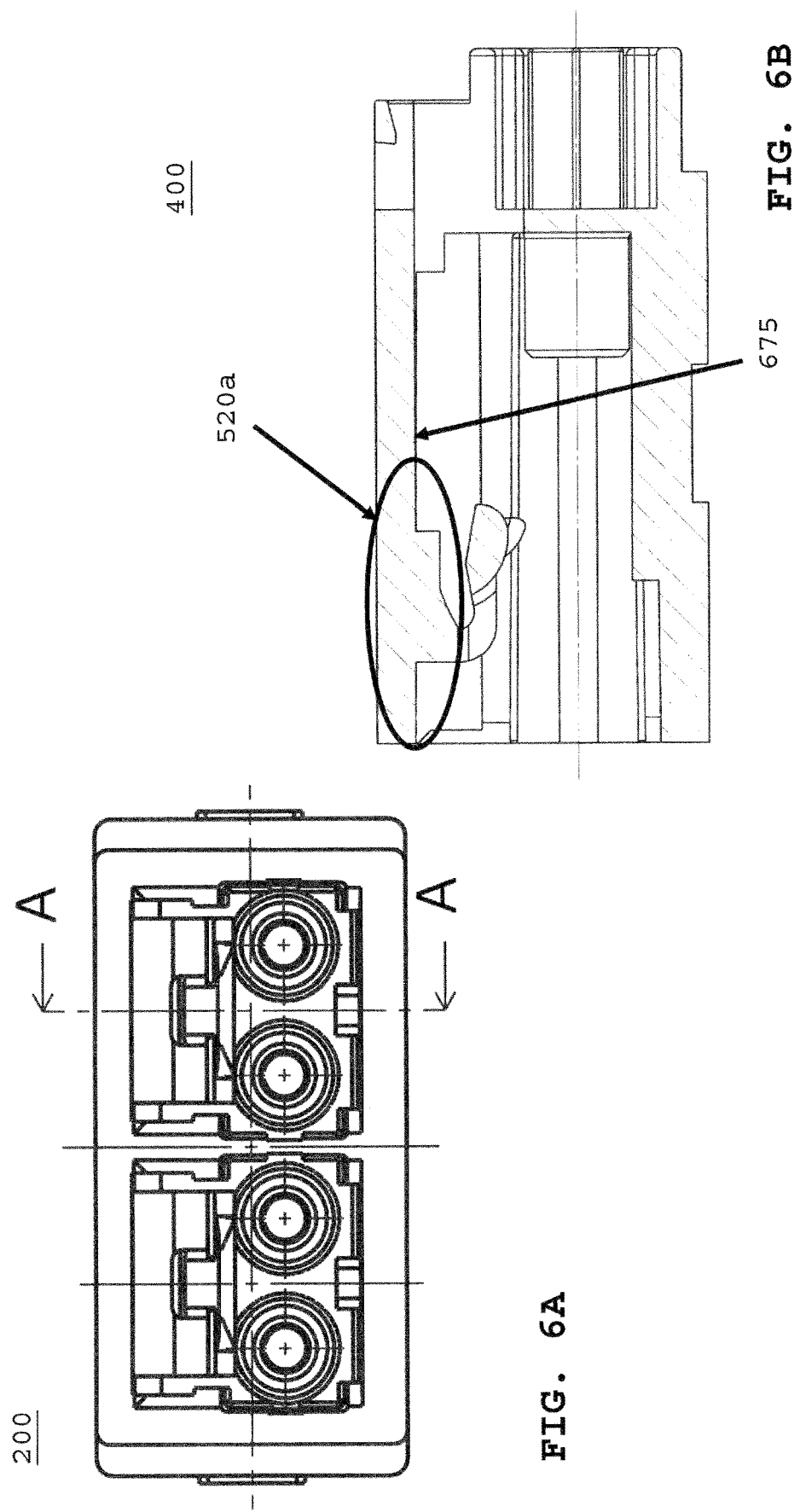

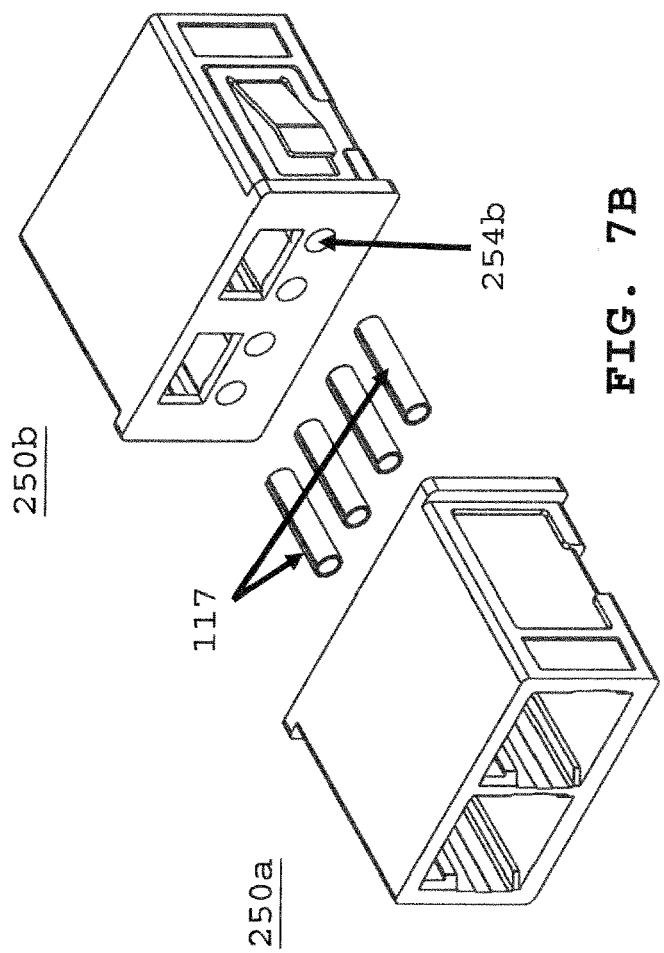
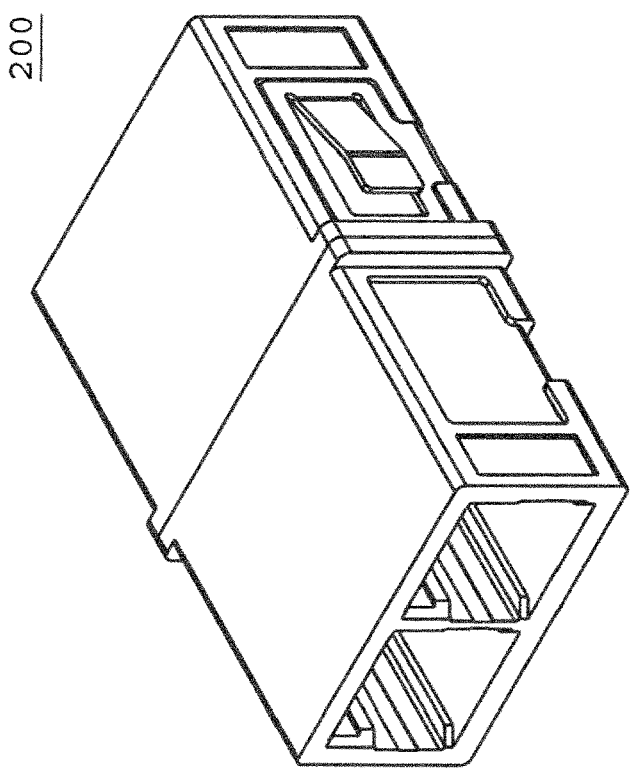
FIG. 7B
FIG. 7A

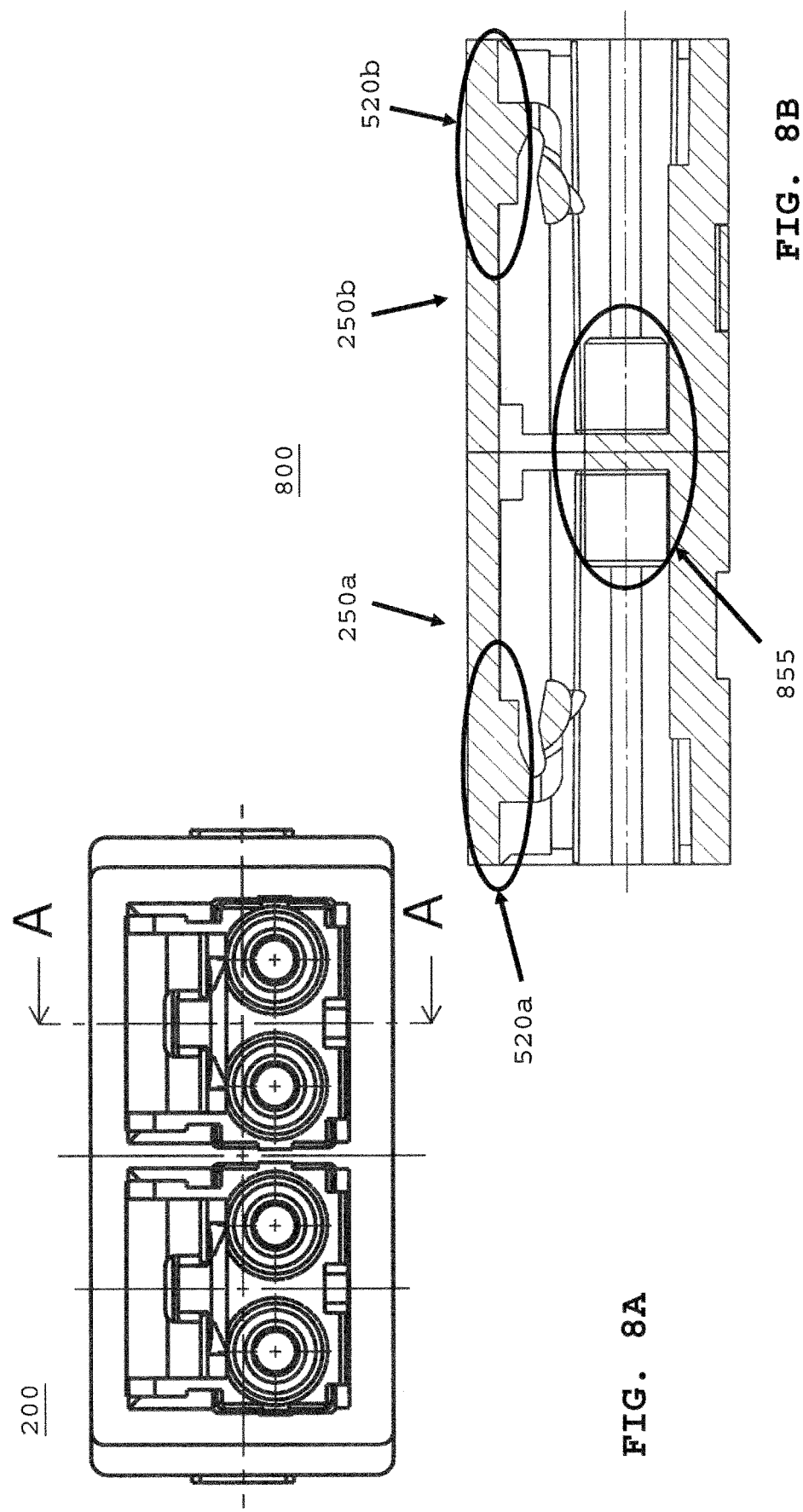

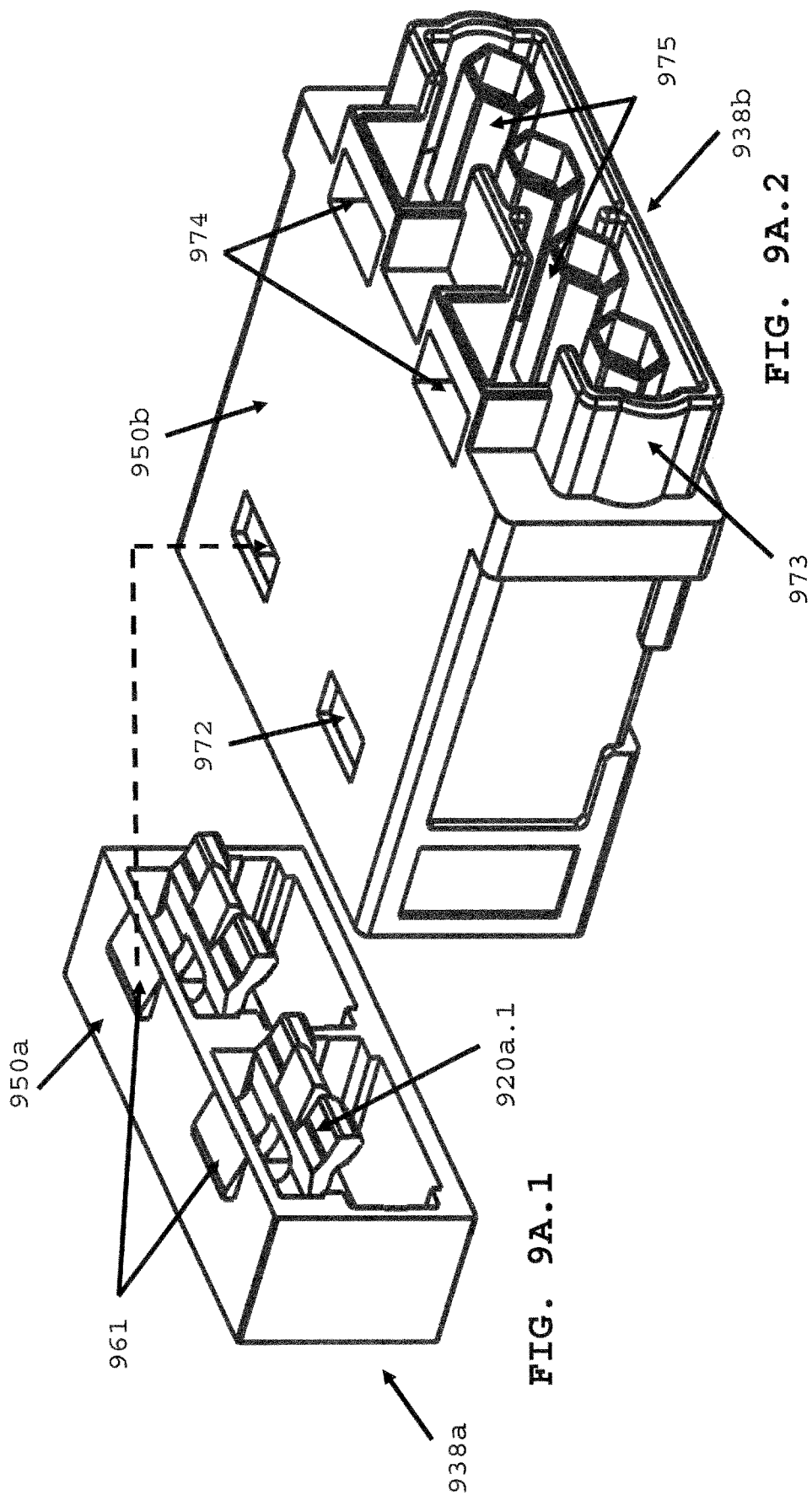

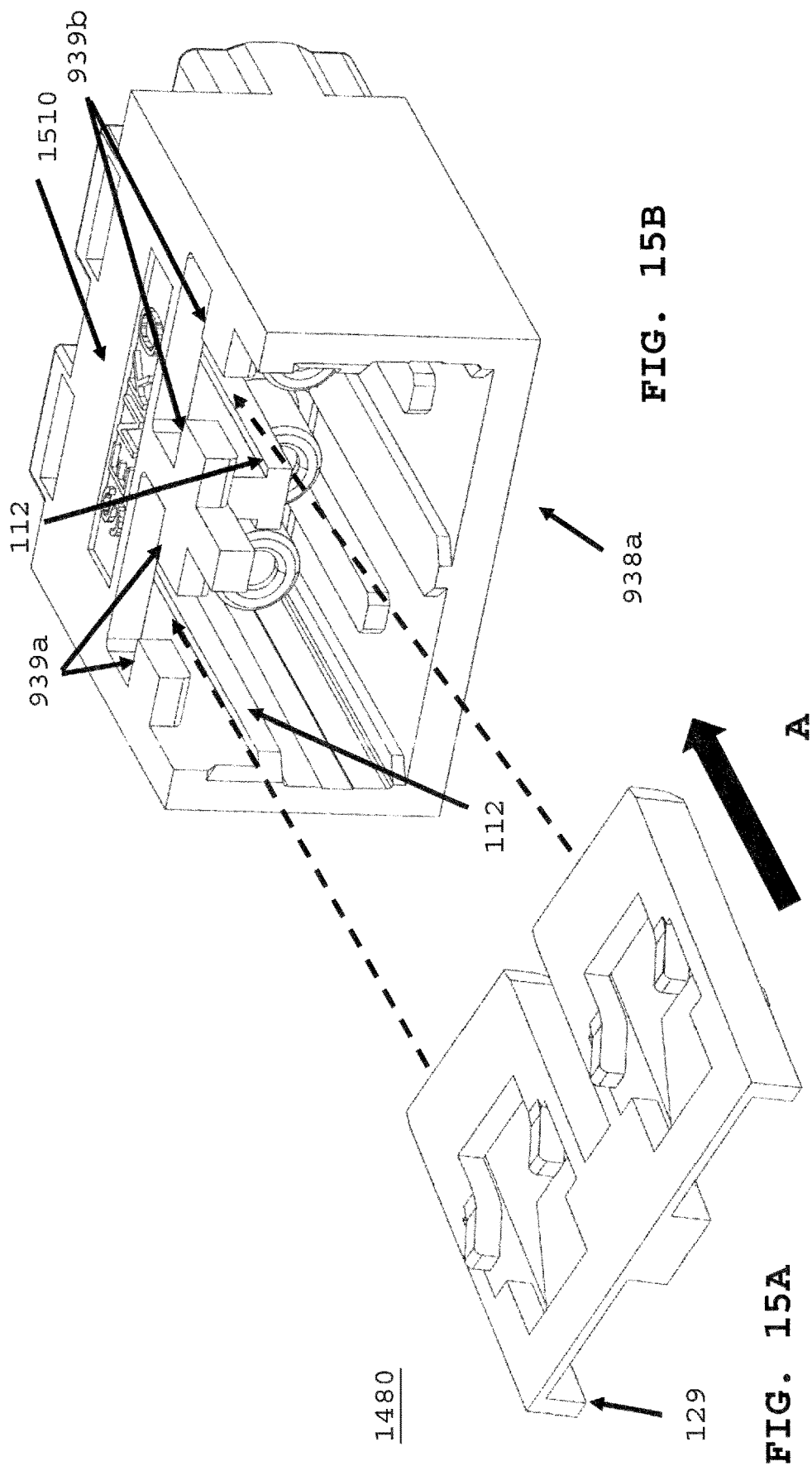

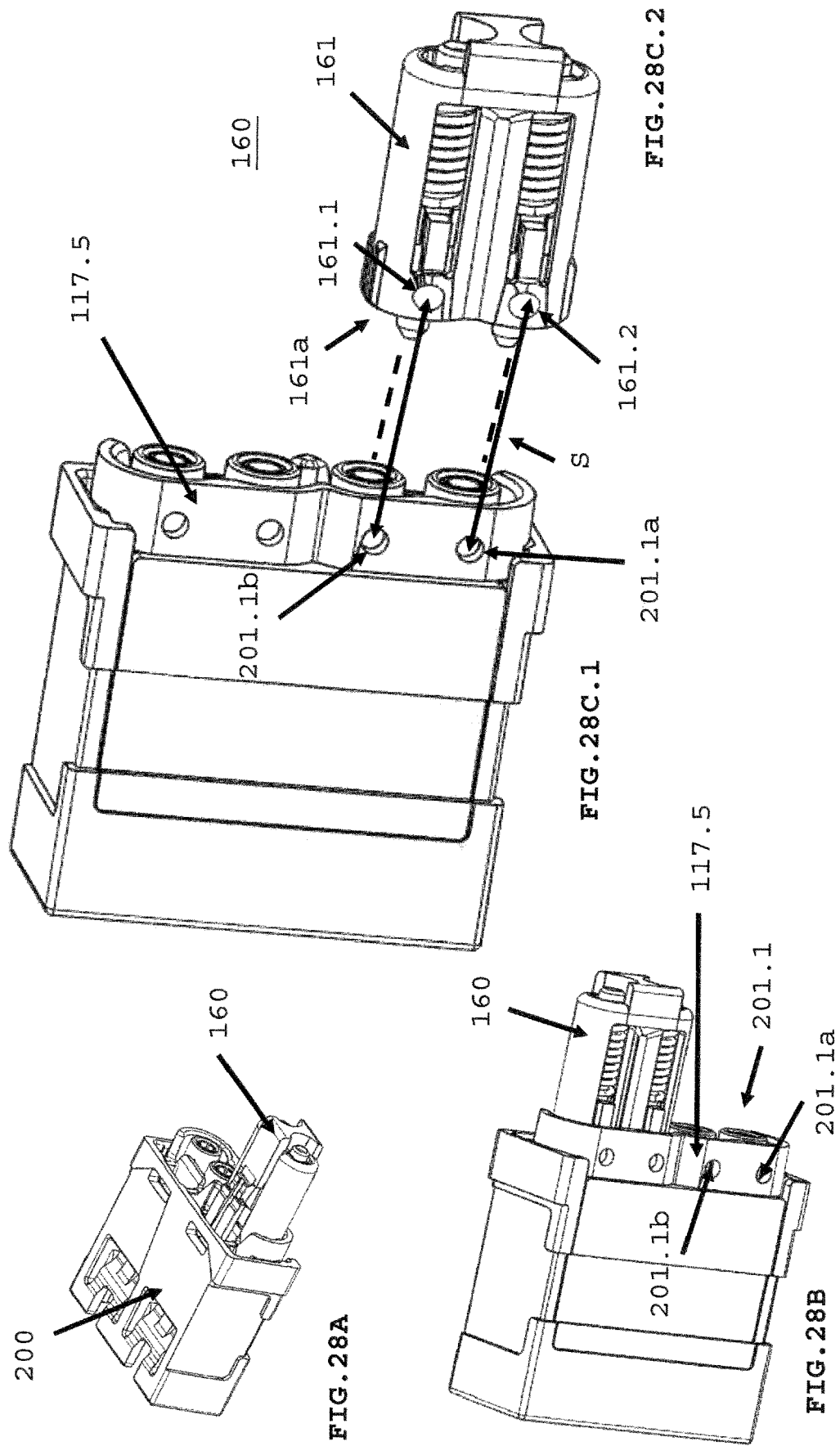

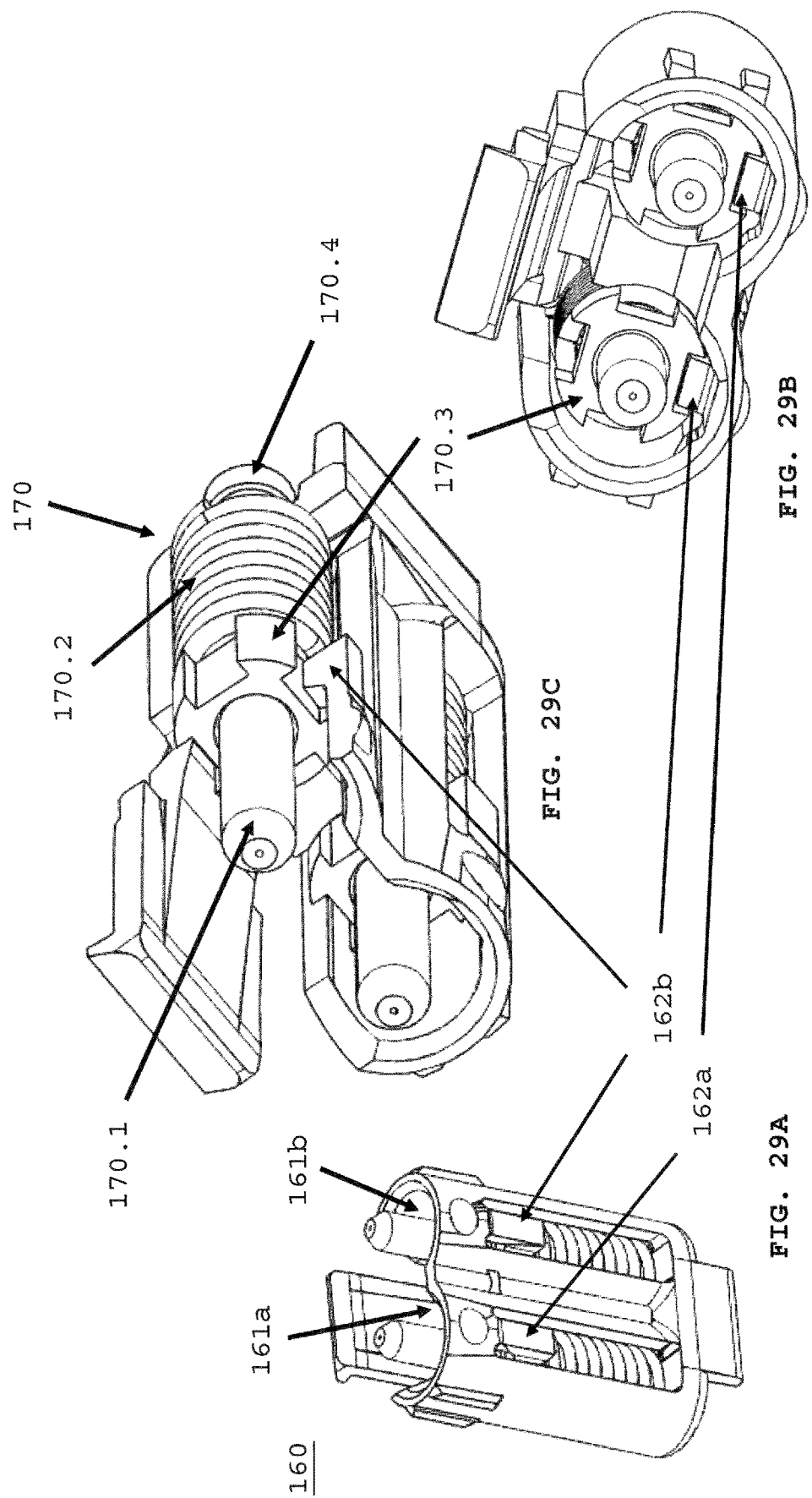

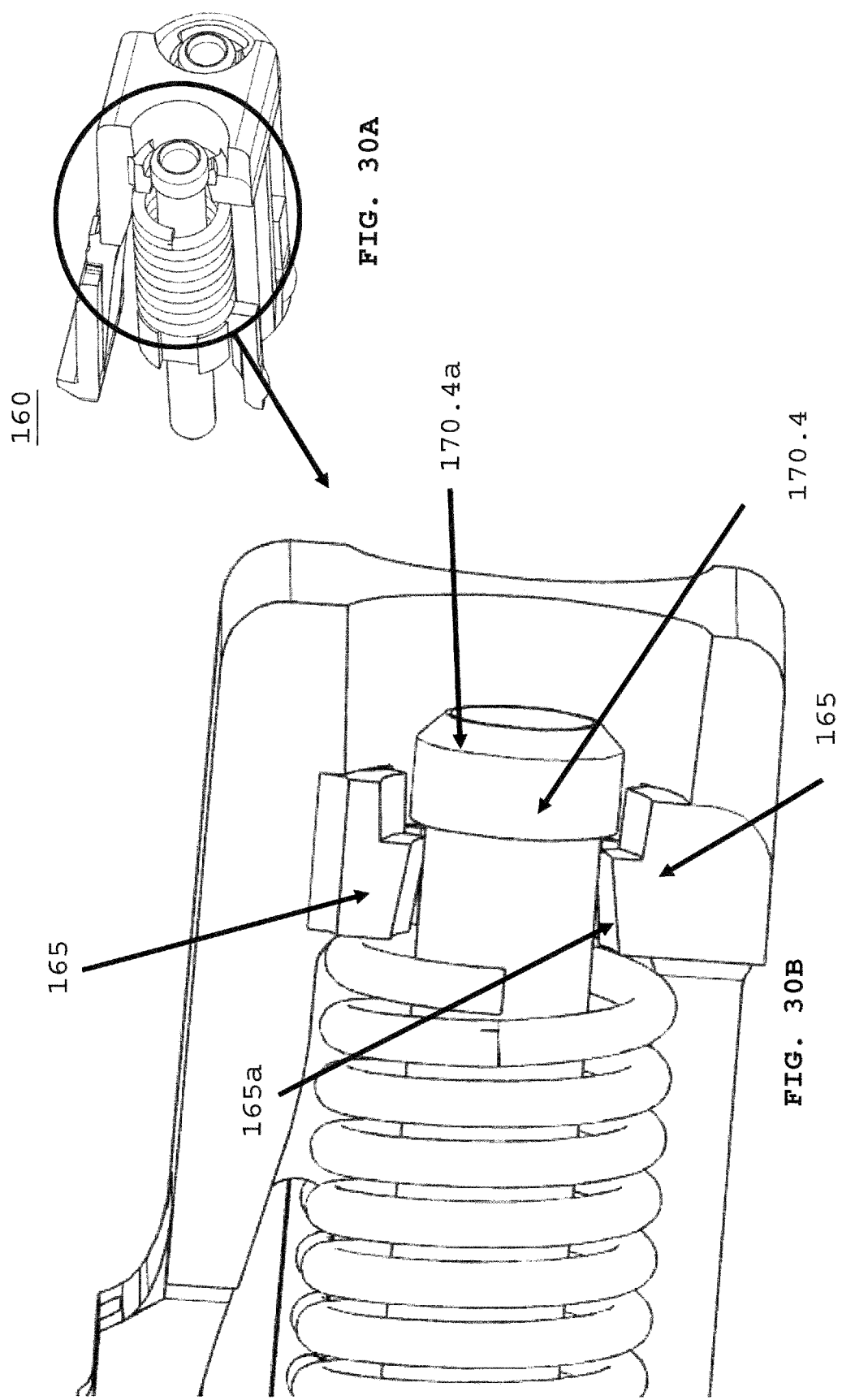

FIBER OPTIC RECEPTACLE WITH INTEGRATED DEVICE THEREIN INCORPORATING A BEHIND-THE-WALL FIBER OPTIC RECEPTACLE

CROSS-REFERENCES TO RELATED APPLICATIONS

This application claims the benefit of provisional application 62/658,806 filed on Apr. 17, 2018, under 35 U.S.C. sec. 119(e), and this application is also claiming priority as continuation-in-part of U.S. patent application Ser. No. 15/979,596, entitled "Fiber Optic Receptacle with Integrated Device Therein", filed on May 15, 2018, which also claims priority to 62/658,806 filed on Apr. 17, 2018, and U.S. patent application Ser. No. 15/979,596, also claims priority as a continuation-in-part of U.S. non-Provisional application Ser. No. 15/881,309 filed on Jan. 26, 2018, entitled Modular Connector and Adapter Devices," now U.S. Pat. No. 10,185,100 patented on Jan. 22, 2019, which claims priority to U.S. Provisional Application No. 62/457,150, filed on Feb. 9, 2017, entitled "Optical Fiber Connector," and to U.S. Provisional Application No. 62/546,920 filed Aug. 17, 2017, entitled "Narrow Width Adapters and Connectors with Modular Latching Arm," and to U.S. Provisional Application No. 62/452,147, filed Jan. 30, 2017, entitled "Narrow Width Adapters and Connectors with Modular Latching Arm," and to U.S. Provisional No. 62/581,961 filed Nov. 6, 2017, entitled "Narrow Width Adapters and Connectors with Modular Latching Arm," each of which is incorporated by reference in its entirety.

FIELD OF THE INVENTION

The present invention relates to fiber optic connectors and adapters, and more particularly, to fiber optic adapters for mating multi-fiber optic ferrule connectors and fiber optic connectors.

BACKGROUND OF THE INVENTION

Modern high capacity optical systems often utilize fiber optic ribbons for inter-system connection. As there are multiple connection points in an optical path, there are needs for mating two fiber optic ferrules or a ferrule to another connector. In the mating of two fiber optic ferrules or a ferrule and a connector, the mechanical and optical alignment is paramount. Slight misalignment can result in significant signal loss, especially in the case of ferrules and connectors for multi-fiber optic ribbons and cables. Therefore, there is a need for an adapter that can hold and secure two fiber optic ferrules or a ferrule and a connector in alignment with precision. The adapter design should also allow that installation of the ferrules and connectors that is easy enough for in-field assembly. Further, the adapter should be durable in design and/or material for repeated installations and uninstallations.

SUMMARY OF THE INVENTION

According to the present invention, a fiber optic adapter for mating a multi-fiber optic ferrule connector at a second end and a multi-fiber optic connector with a push/pull tab at a first end is provided. The fiber optic adapter includes an integrated engagement device within a receptacle at a first end to secure a fiber optic connector therein, and a receptacle at a second end. An opening in second receptacle outer housing secures a latch on an outer housing of the multi-fiber optic ferrule connector. The multi-fiber optic ferrule connector comprises a housing with a plural of ferrules inserted from the front end as opposed to the rear, and the latch secures the ferrules in place, within the housing when the latch is secured in an opening of the housing. Without departing from the scope of the invention, the second receptacle may contain an integrated engagement device. The first fiber optic connector type used can differ from the second fiber optic connector type depending on the use of the engagement device or not.

An integrated or removable, replaceable engagement device has one or more flexible arms that are received and secured in a corresponding widthwise recess at a proximal end of the fiber optic connector. The arms latch the multi-fiber optic connector in place so as to secure the connector inside the receptacle of the adapter. The arms are configured to release the connector when the user pulls on a pull/push tab located at a distal end of the connector. The multi-fiber optic connector's proximal end may have a widthwise recess on a bottom or top surface, while a connector may have recess along a side to engage a similar engagement device. The multi-fiber optic connector may use a latch on the connector outer housing instead of the latch within the adapter structure or on the latch is on the engagement device.

In an alternative embodiment, the engagement device is molded into adapter housing of each receptacle. In this embodiment, the integrated engagement device is not a removable or replaceable single piece. The integrated engagement device may be ultrasonic welded onto the inner housing of the adapter or similar method to secure device within receptacle. Due to the small size of connectors, adapters and engagement devices, molding the engagement device within the adapter reduces assembly time, breakage, lost parts, and misalignment upon insertion of a connector to be secured by said device. Since each engagement device is configured to correspond to a connector type, inventory and kitting is simplified to an adapter/connector pair.

In an alternative embodiment, an adapter may be two piece comprising a front body portion housing either engagement device, and a second body portion accepting a latch on an outer housing of the multi-fiber optic ferrule connector. The two body portions are secured using existing components such as a plural of alignment sleeves press-fitted within openings in the body, snaps, or clips arranged between the body portions. Any receptacle of the portions may accept either engagement device.

In an alternative embodiment, the adapter may use a unitary or one-piece device with a plural of engagement devices. The unitary device is inserted into an adapter receptacle, and secured therein with a plural of protrusions on the exterior surface of the unitary device that are configured to engage corresponding adapter structure. The protrusions would snap in behind adapter structure and prevent movement of the unitary device upon insertion and release of a fiber optic connector.

In an alternative embodiment, an adapter portion may be preconfigured with an integrated engagement device or a unitary engagement device for each receptacle, and adapter is separable into two portions. This engagement device may be removable/replaceable or molded as one-piece with adapter housing, or a removable/replaceable unitary device with two or more engagement devices depending on the number of adapter receptacles. The proximal end of a connector is closer to a ferrule, while a distal end is closer to a boot or cable holding fiber optic glass that is contained within a ferrule. The fiber optic glass carries the information signal. An adapter has a first end and a second end. An adapter may be a single housing or unitary body.

BRIEF DESCRIPTION OF THE DRAWINGS

Embodiments of the invention are described in more detail hereinafter with reference to the drawings, in which:

FIG. 1A depicts a fiber optic adapter with a plural of receptacles on either side each have a single, releasable and replaceable engagement device therein;

FIG. 1A.1 is a zoomed view of the engagement device inserted into a receptacle of FIG. 1A without a multi-fiber optic ferrule connector secured therein;

FIG. 1A.2 is a zoomed view of the device of FIG. 1A.1 illustrating engagement device secured in a receptacle where the device makes contact and is supported within the adapter structure;

FIG. 1B depicts a side perspective view of a unitary engagement device, that can be secured within adapter receptacle of FIG. 1A.1;

FIG. 1B.1 depicts a bottom, side perspective view of a unitary engagement device that can be secured within adapter receptacle of FIG. 1A.1;

FIG. 1C depicts a side perspective view of another embodiment of a unitary engagement device that can be secured within adapter receptacle of FIG. 1A.1.

FIG. 1C.1 depicts a bottom, side perspective view of FIG. 1C unitary engagement device that can be secured within adapter receptacle of FIG. 1A.1;

FIG. 1E is a perspective of a CS® multi-fiber optic connector, having a push-pull tab, inserted into an adapter of FIG. 1A and secured therein using an engagement device;

FIG. 1E.1 is a zoomed view of a proximal end of the multi-fiber optic connector of FIG. 1E;

FIG. 2B is a perspective front angled view of a first portion of a detachable body of adapter of FIG. 2A;

FIG. 2B.1 is a perspective view of a second portion of a detachable body of adapter of FIG. 2A;

FIG. 2C is a perspective view of an assembled adapter of FIG. 2A, having an engagement device integrated into each receptacle of the adapter;

FIG. 6A is a perspective front view of adapter of FIG. 2A with a cross section A-A in a receptacle of the adapter;

FIG. 6B is a cross section view along plane A-A of FIG. 6A without a multi-fiber optic connector of FIG. 1E inserted therein;

FIG. 7A is a perspective view of the adapter of FIG. 2A without integrated engagement device in each adapter receptacle;

FIG. 7B is an exploded view of FIG. 7A;

FIG. 8A is a perspective front view of adapter of FIG. 2A with a cross section A-A at a center-line of receptacle of adapter;

FIG. 8B is a cross section perspective view along plane A-A of FIG. 8A with integrated engagement devices at opposing ends of adapter;

FIG. 9A.1 is a perspective back inside view of a first portion of a multi-body adapter with integrated engagement device in each receptacle;

FIG. 9A.2 is a perspective rear view of a second portion of multi-body adapter of FIG. 9A.1;

FIG. 15A is perspective view of unitary engagement device of FIG. 14;

FIG. 15B is a perspective front view of the adapter of FIG. 14 prior to insertion of unitary engagement device of FIG. 15A;

FIG. 28A is a perspective view of an adapter with a behind-the-wall connector therein;

FIG. 28B is a bottom view of FIG. 28A;

FIG. 28C is a view of adapter of FIG. 28B;

FIG. 28C.1 is a bottom view of a behind-the-wall connector;

FIG. 29A is a bottom, angled view of the connector of FIG. 280.1;

FIG. 29B is the front view of the connector of FIG. 28C.1;

FIG. 29C is a bottom view with exposed ferrule assembly of the connector of FIG. 28C.1;

FIG. 30A is a side cut-away view of the connector of FIG. 29C.2 showing ferrule assembly;

FIG. 30B is a zoomed view of FIG. 30A at ferrule assembly.

DETAILED DESCRIPTION

Figure 1D:
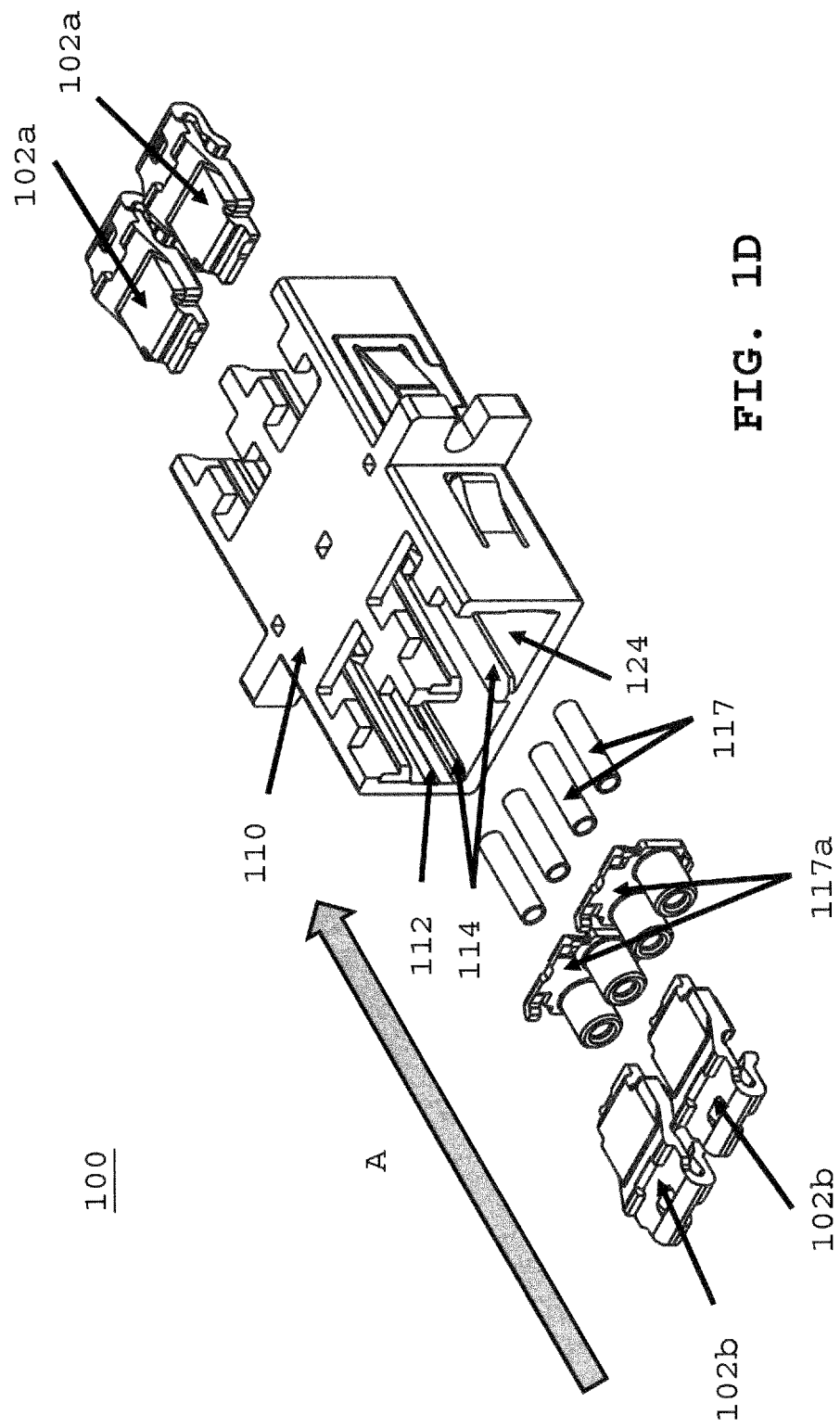
FIG. 1D is an exploded view of FIG. 1A.

In the following description, apparatuses for mating opposing multi-fiber optic connectors of differing types or the same type are set forth as preferred examples. The mating structure includes an engagement device that may be removable/replaceable within a receptacle, or integrated or permanently secure within a receptacle, both devices configure to mate with and secure a proximal end of a fiber optic connector therein. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

FIG. 1A depicts an embodiment of a fiber optic adapter 100 with an engagement device 120 inserted into a receptacle 124 of adapter 100. Referring to FIG. 1A.1, engagement device has openings 122. The openings provide stress relief as the engagement device radius 120 reverses a plural of legs (125, 128a, 128b). A proximal end of connector 130 has widthwise recess 132, that accepts device legs (128a, 128b). Once the legs are in the recess, an attempt to pull the connector out of the adapter receptacle, the legs are captured in the recess. This capture prevents an unintended removal of connector unless operator pulls on push/pull tab as described herein. The recess is formed is shaped as a groove with a width to accept arm thickness. Upon pulling on the connector, not the push-pull tab, the legs resist removal of the connector. The legs retain a connector by providing an opposing force when positioned within the recess 132.

Referring to FIG. 1A.2, a zoomed portion of adapter outer housing 110 cutouts illustrates contact surfaces that securing points 126 engage with to retain device 120 within an adapter or transceiver receptacle port. Cutout 116 on device 120 upper surface receives corresponding adapter housing structure. Referring to FIGS. 1B and 1C, the legs (128a, 128b) engage a corresponding widthwise recess 132 on a surface of a proximal end 146a of a push/pull connector 130, as shown in FIG. 1E.1. FIG. 1B depicts an embodiment of a removable, replaceable engagement device 102a. FIG. 1C depicts another embodiment of a removable, replaceable engagement device 102b. The aforementioned engagement devices (102a, 102b) are formed as part of receptacle of an adapter in the present invention.

Figure 2A:
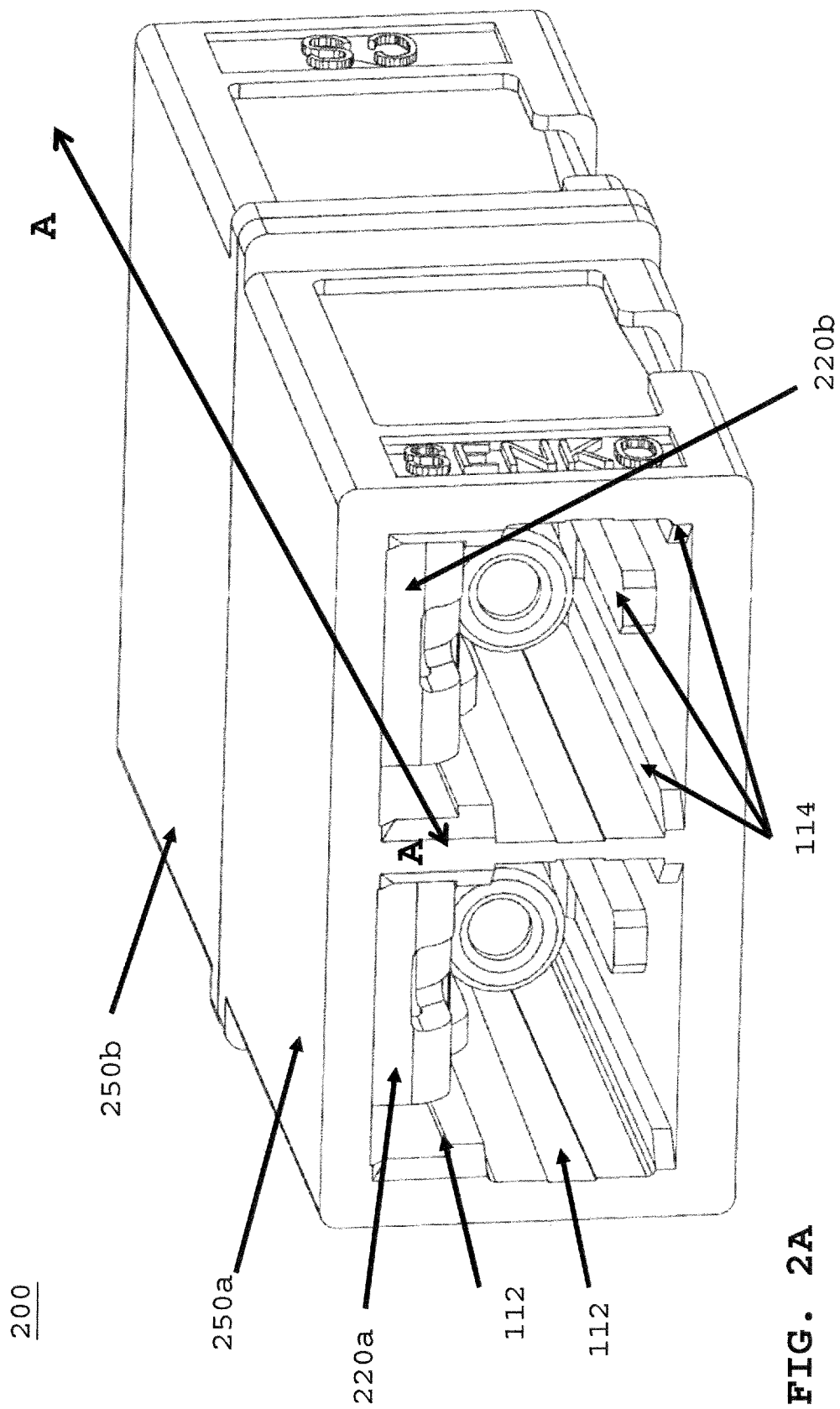
FIG. 2A is a front perspective view of an embodiment of an adapter having an integrated engagement device within each receptacle port.
Figure 18:
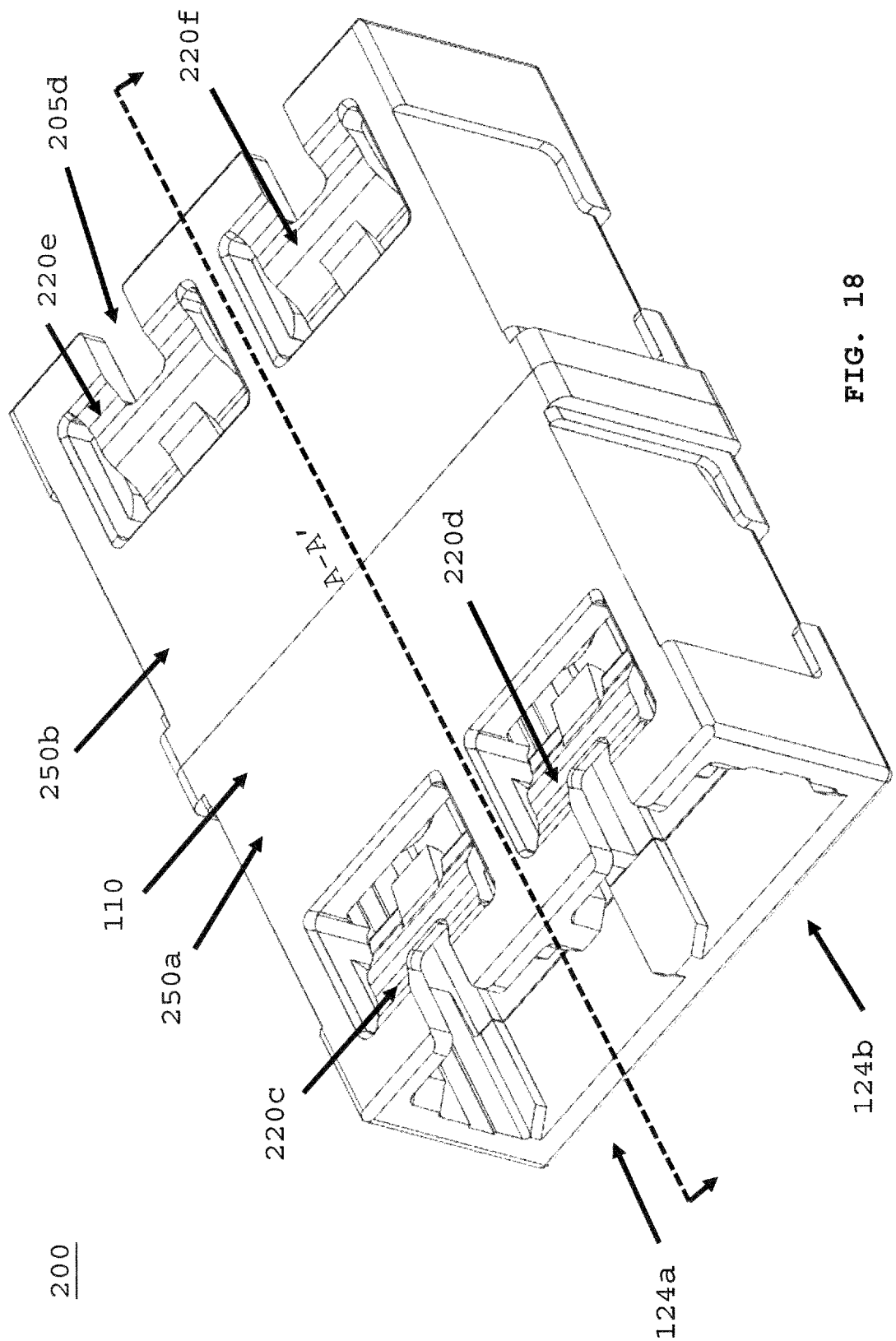
FIG. 18 is a perspective view of another embodiment of an adapter with integrated engagement devices.

Referring to FIG. 1D, the adapter 100 is assembled in the direction of arrow "A". Alignment sleeves 117 are inserted into adapter housing between a first and a second end. Alignment sleeve holder or assembly 117a accepts one end of alignment sleeve, and alignment sleeve holder 117a is secured within corresponding adapter structure housing 110. Integrated engagement devices (220a, 220b) may be molded as one integrated piece into an adapter receptacle inner housing structure, as depicted in FIG. 2A and FIG. 18. Without departing from the scope of the invention, integrated engagement device maybe secured to any surface of an adapter housing. Replaceable engagement devices (102a, 102b) are configured with outer structure (e.g. securing points 126) to secure within corresponding adapter housing structure.

Referring to FIG. 1E.1, proximal end 146a is nearer to ferrule 148. Distal end 146b is nearer to a boot. Referring to FIG. 1A.2, adapter housing 110 shows engagement device 102 inserted into a receptacle. The cross-section depicts engagement device securing points 126 that engage adapter housing to prevent movement upon inserting and removing a connector (not shown). Referring to FIGS. 1B-1C, engagement device securing points 126 engage opposing surfaces within adapter receptacle housing to secure engagement device therein as shown. Referring to FIG. 1B.1 and FIG. 1C.1, engagement device guide rails 129 are supported by inner rail support 112 within adapter receptacle 124, upon insertion of engagement device into receptacle port 124.

Figure 1F:
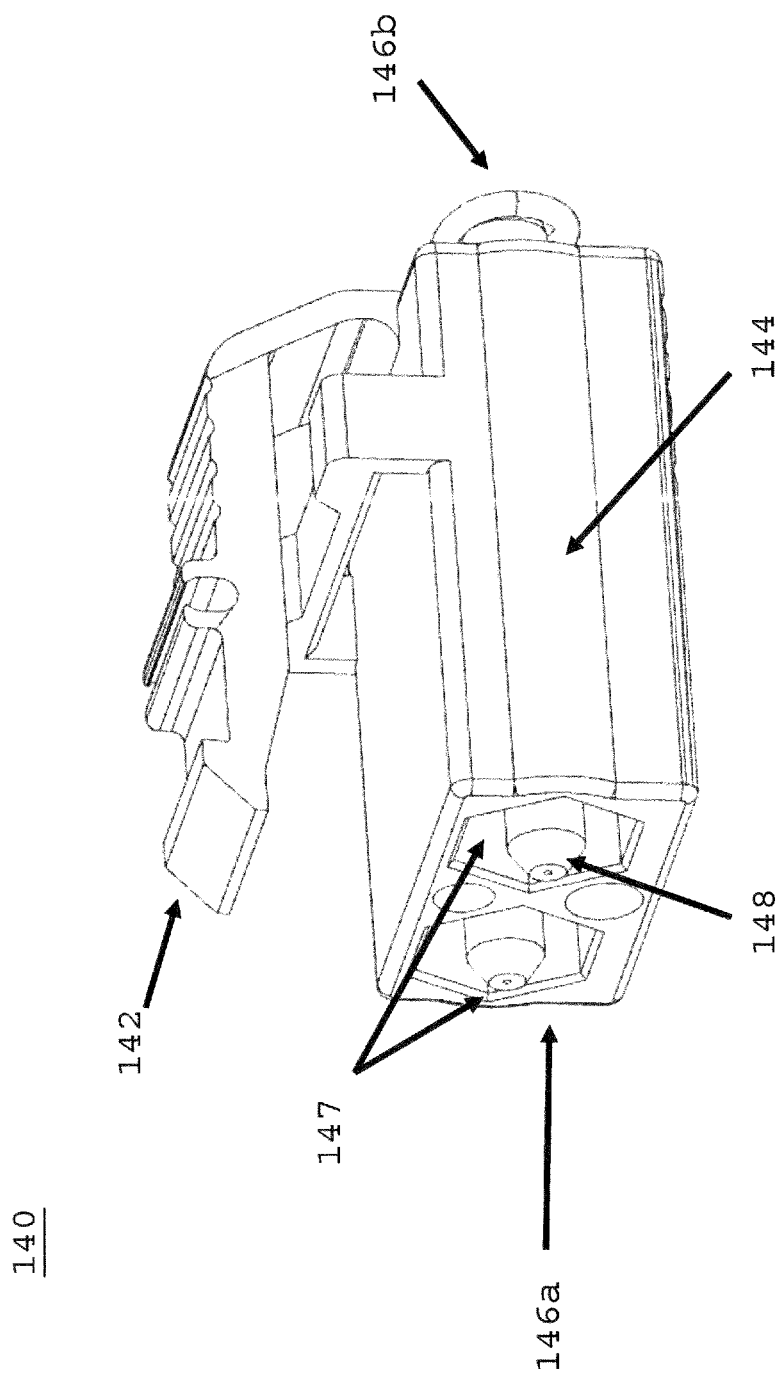
FIG. 1F is a perspective view of a multi-fiber optic ferrule connector that can be secured in an end of the adapter of FIG. 1A without an engagement device.
Figure 4:
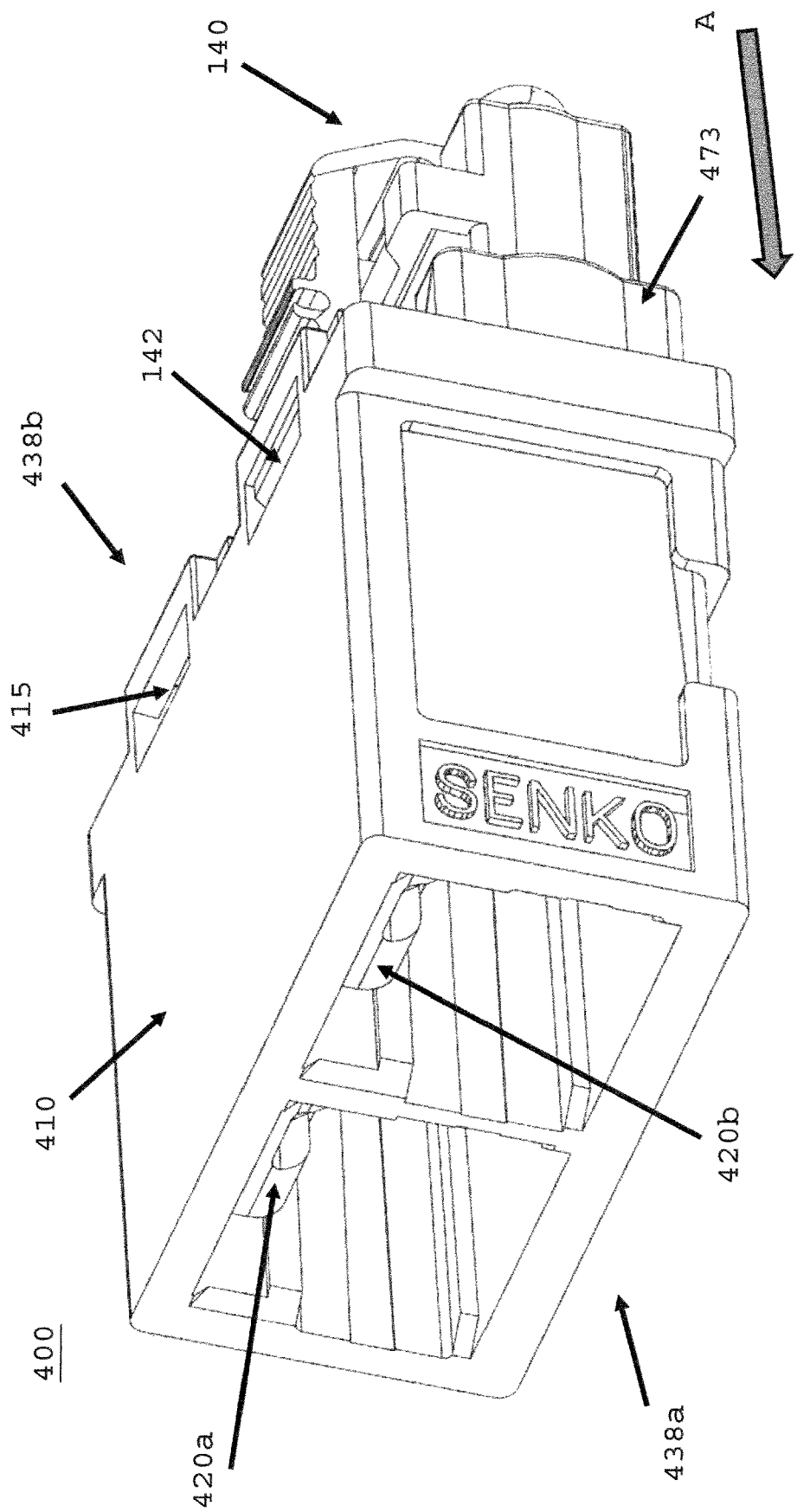
FIG. 4 is a side perspective view of adapter of FIG. 2A with the multi-fiber optic ferrule connector of FIG. 1F inserted at a second end in direction of arrow "A"
Figure 9A:
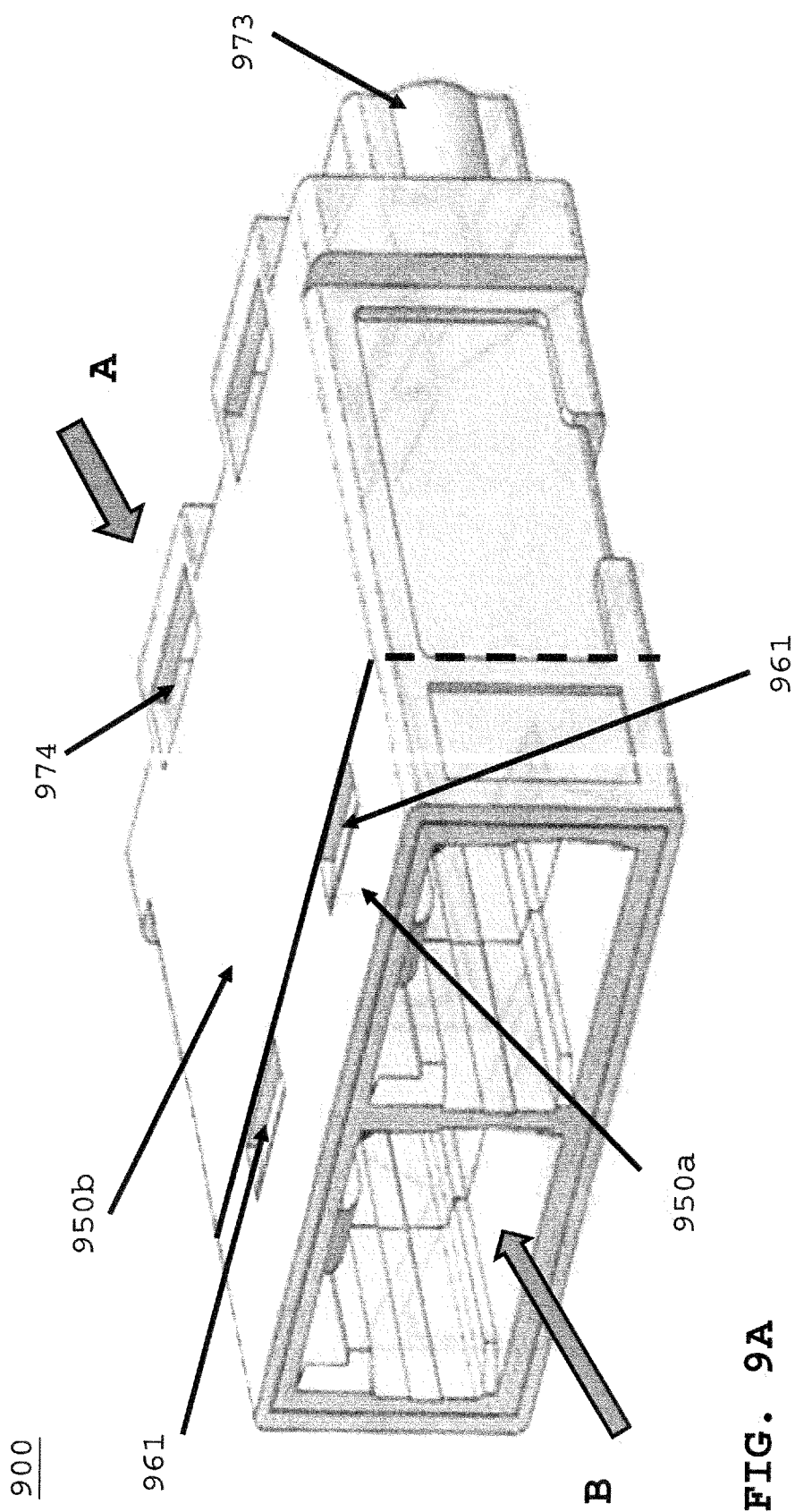
FIG. 9A is a perspective view of another embodiment of multi-body adapter with integrated engagement devices.

Referring to FIG. 1E, push/pull multi-fiber optic connector 130, with pull tab 139, allows a user to release connector from receptacle by pulling on tab 139 in direction "P". To secure connector in a receptacle, engagement device (102a, 102b) is activated upon insertion of a proximal end of the connector into the receptacle. Referring to FIG. 1B, middle arm 125 contacts ramp 134 (refer to FIG. 1E.1), as middle arm is raised a pair of outer arms or legs (128a, 128b) are raised. As connector is further inserted into receptacle, outer arm tension is released and outer arms drop into are retained within a widthwise recess 132 at a proximal end of connector. This secures or latches connector into adapter receptacle. Once secured, engagement device prevents longitudinal movement of a multi-fiber optic connector along longitudinal axis, from a first end to a second end of fiber optic adapter 100 inside a receptacle. This is the same operation for device 102a, FIG. 1B.1 and also occurs for device 102b, FIG. 1C. FIG. 1F depicts a perspective view of an alternative fiber optic connector 140. Connector 140 is inserted in a second end of adapter 100 without an engagement device 102a, 102b. Referring to FIGS. 1F and 4, a latch 142 is depressed and seats within an adapter housing opening 415 to secure connector 140 in adapter receptacle. Referring to FIG. 1F, connector housing 144 mates with a shroud 473 to align connector 140 into adapter receptacle that allows latch 142 to be secured within opening 415. Refer to FIG. 9A for similar operation.

FIG. 2A shows an alternative adapter 200 that comprises first body portion 250a and second body portion 250b. Adapter 200 comprises front portion or first body portion 250a and back portion or second body portion 250b, each adapter opening or receptacle includes an integrated engagement device (220a, 220b), the opening further comprises plural of rails 114 and inner rail support 112 that mate with corresponding structure at an outer housing 136 (FIG. 1E.1) of connector 130. The receptacle further includes rail support 114 that accepts guide rail 129 (refer to FIG. 1C or FIG.

Figure 5A:
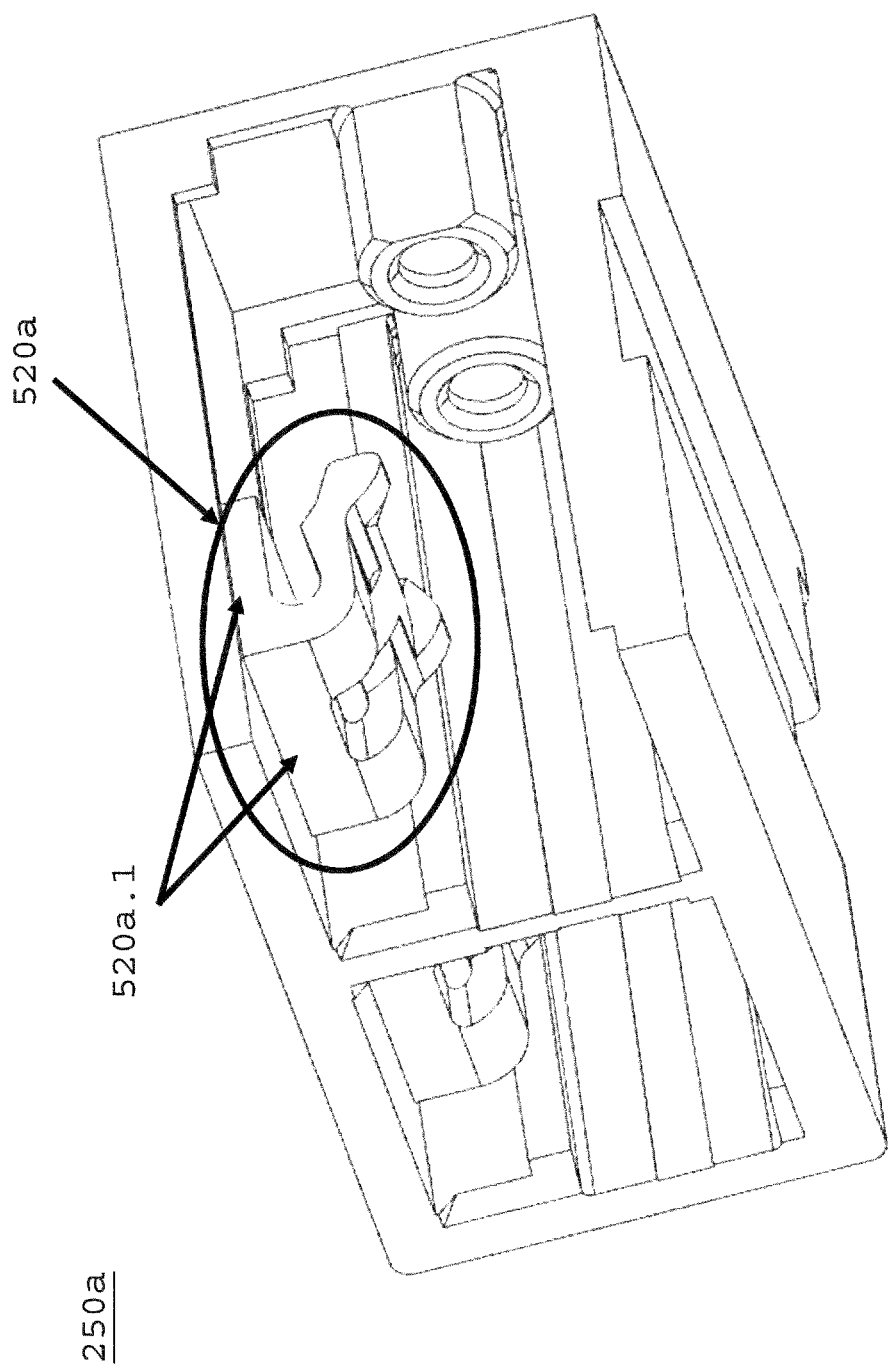
FIG. 5A is a cross-sectional perspective front view from a plane cutting along B-B' of FIG. 2B illustrating engagement device molded into inner adapter housing.
Figure 5B:
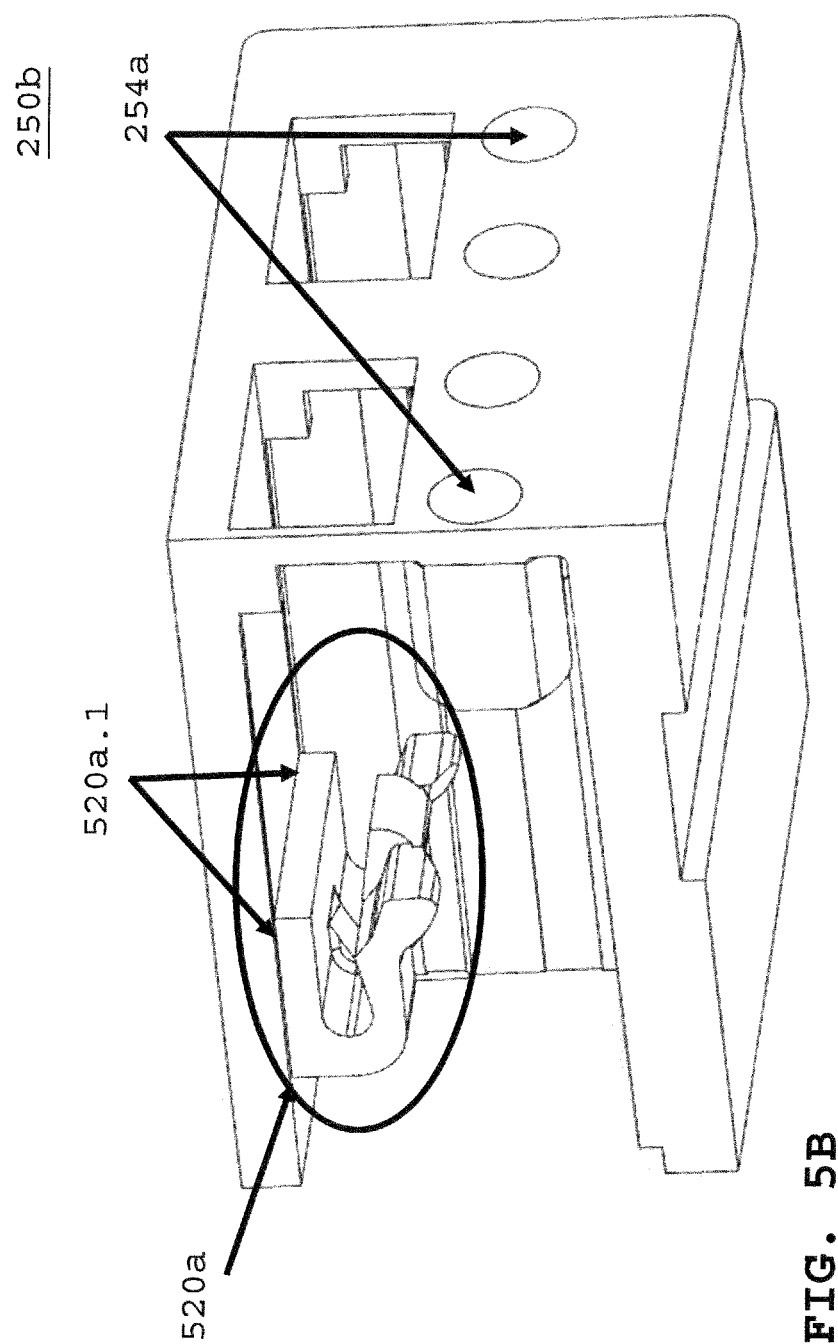
FIG. 5B is a cross-sectional perspective view from a plane cutting along B-B' of FIG. 2B illustrating engagement device molded into inner adapter housing at a distal end of first body portion of adapter FIG. 2A.

1B) located on an engagement device 102a, 102b. Referring to FIG. 2B, cross section B-B' is shown in FIG. 5A and FIG. 5B.

Referring to FIG. 2B, the first body portion comprises engagement device (220a, 220b) respectively in each receptacle port at a first end. Referring to FIG. 2C, the second body portion 250b comprises a plural of alignment sleeve openings 254b at a first end. Openings 254b accept a corresponding alignment sleeve 117 (refer to FIG. 1D). Referring to FIG. 7B, sleeve 117 at a first end engages an opening at a second end of first body portion 250a. Upon pushing together first and second body portion, a plural of alignment sleeves 117 secure first body portion 250a and second body portion 250b together to form adapter 200, as shown in FIG. 7A.

Referring to FIG. 2B.1, a front view of adapter 200 shows engagement device (220a, 220b) integrated with adapter inner housing 675 (FIG. 6B), Integrated engagement device (220a, 220b) does not use inner rail support 112 and rails 114. Neither engagement devices (220a, 220b) occupy the same space as replaceable version used within adapter 100. Integrating an engagement device reduces any longitudinal movement of the ferrules, which reduces signal loss, reduces engagement device breakage, reduces manufacturing costs because it is a one-piece design, and helps ensure alignment of connector 130 within receptacle. Adapters and transceiver receptacles are becoming more compact and smaller, and molding one-piece devices is critical to this success.

Figure 3:
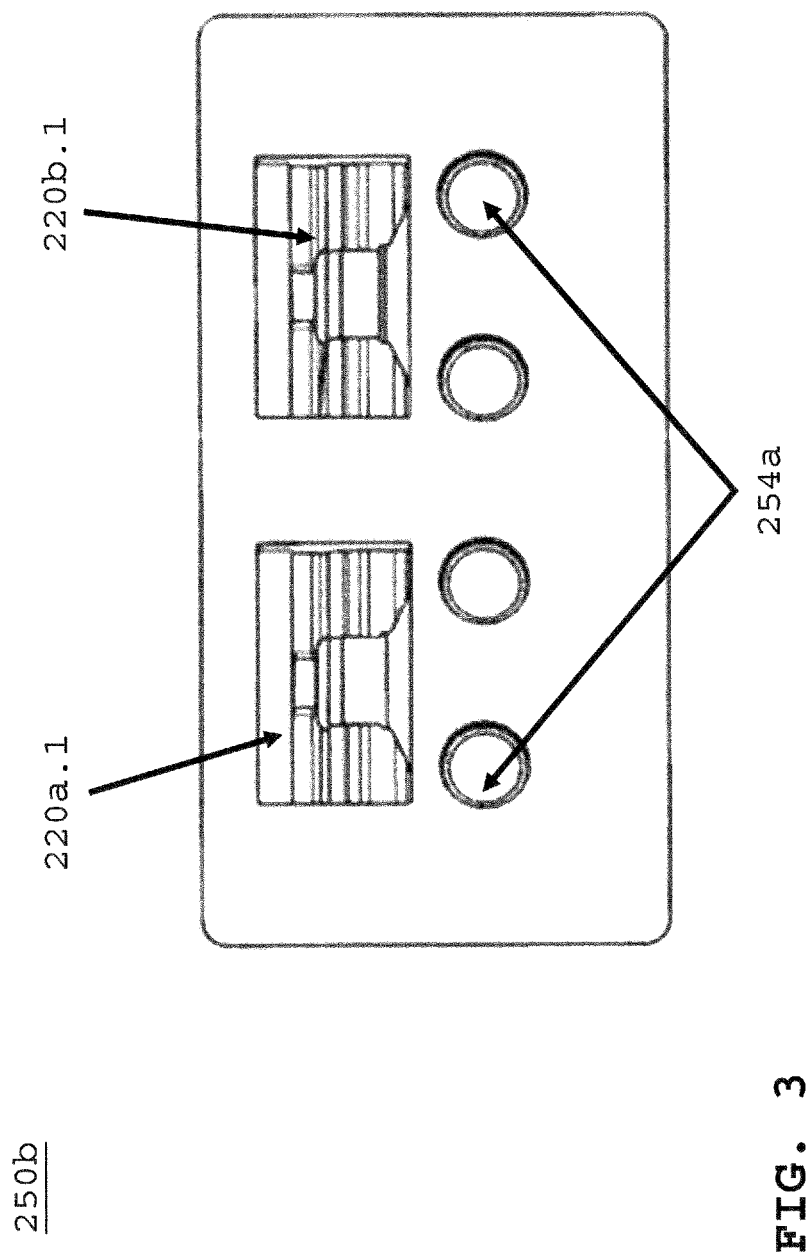
FIG. 3 is front view of the second portion of FIG. 2C after detached from a first body portion.

FIG. 3 shows a plural of alignment sleeve openings 254a that accept a corresponding alignment sleeve which connect the two body portions together. A rear view of engagement devices (220a.1, 220b.1) are shown in an adapter receptacle of second body portion or back body portion 250b. FIG. 4 comprises integrated engagement device in each receptacle at first end 438a, and connector 140 inserted at second end 438b of single body adapter. First end 438a receptacle can accept connector 130. Second end 438b receptacle can accept second connector 140 inserted in direction of arrow "A". Adapter housing 410 has an opening 415 that accepts latch 142 located at outer housing of connector 140. Integrated engagement devices (420a, 420b) can accept connector 130. This is similarly disclosed in FIG. 9A.1 and FIG. 9A.2.

FIG. 5A is cross-sectional B-B' of first body portion or front body portion 250a depicting integrated engagement device 520a, which is a molded as one piece within the inner housing as shown along sides 520a.1 of engagement device 520a, to inner surface 675 (refer to FIG. 6B) of adapter housing 110. Referring to FIG. 5B, cross-sectional B-B' of the first body portion 250a depicts integrated engagement device 520a, which is molded as one-piece within inner adapter housing as shown along sides 502a.1 of engagement device 520a, to inner surface 675 of adapter housing 110. The corresponding alignment sleeve openings 254a at a distal end of first body portion accept an end of alignment sleeves 117 to secure first and second body portion as a single adapter. A second end of alignment sleeves 117 are accepted into corresponding alignment sleeve openings 254b. The two portions are pushed together along a longitudinal axis of alignment sleeves 117 to secure first and second body portions together. Engagement device 102a, 102b may be ultrasonic welded to an inner housing of the adapter without departing from the scope of the invention (as shown in FIG. 7B)

FIG. 6A is a front view of adapter 200 with a cross-section along A-A along a longitudinal axis from a first end to a second end of an adapter or transceiver receptacle. FIG. 6B is a cross-section along A-A shows the engagement device 520a molded as part of inner housing 675 of adapter 400 at a first end, as shown in cross-section. FIG. 8A is a front view of adapter 200 as shown in FIG. 6A. FIG. 8B is a cross-section along A-A integrated engagement devices (520a, 520b) molded as part of inner housing 675 of adapter 200 at either end, as shown at cross-section. The alignment sleeve 855 secures first body portion 250a and second body portion 250b to form adapter 800.

FIG. 9A depicts another embodiment of two-piece adapter 900. First body portion 950a detaches via latches 961 from second body portion 950b. Connector 130 is inserted in direction of arrow "A", and connector 140 is inserted in direction of arrow "B". This embodiment replaces the alignment sleeves securing the two body portions, as shown in FIG. 7B, with one or more latches 961. FIG. 9A.1 depicts first body portion 950a including integrated hook 920a.1, with portion 950a removed from second body portion 950b, FIG. 9A.2. A pair of latches 961 are secured in openings 972 when first body portion is pushed into second body portion along direction of the dashed arrow. The second body portion can accept connector 140 within shroud 973, at second end 938b of assembled adapter. Connector 140 ferrule openings 147, FIG. 1F, engage alignment sleeve holders 975 and outer housing 144 engages inner housing of shroud 973. This aligns connector 140, so latch 142 is accepted into opening 974, and secures connector 140 into adapter receptacle. First end 938a accepts connector 130, and as a result of the above description two different connectors are in communication along a longitudinal axis of adapter 900.

Figure 10B:
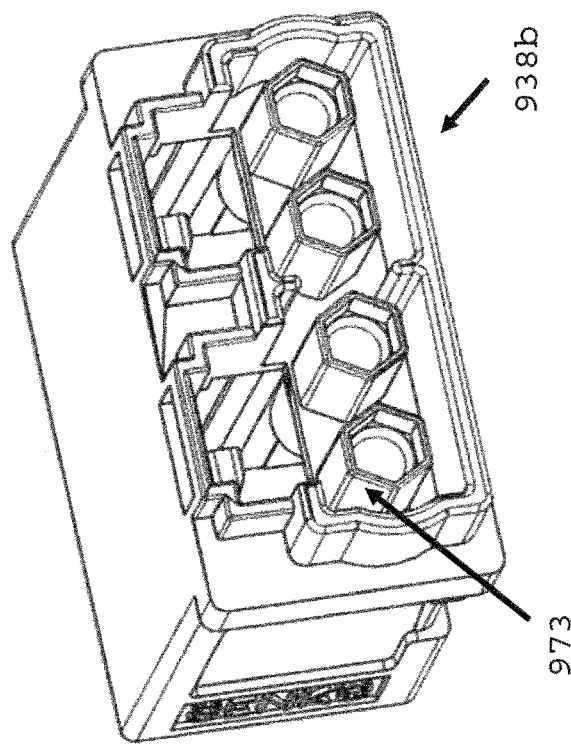
FIG. 10B is a rear perspective angled view of a second body portion of the multi-body adapter of FIG. 2A.
Figure 10A:
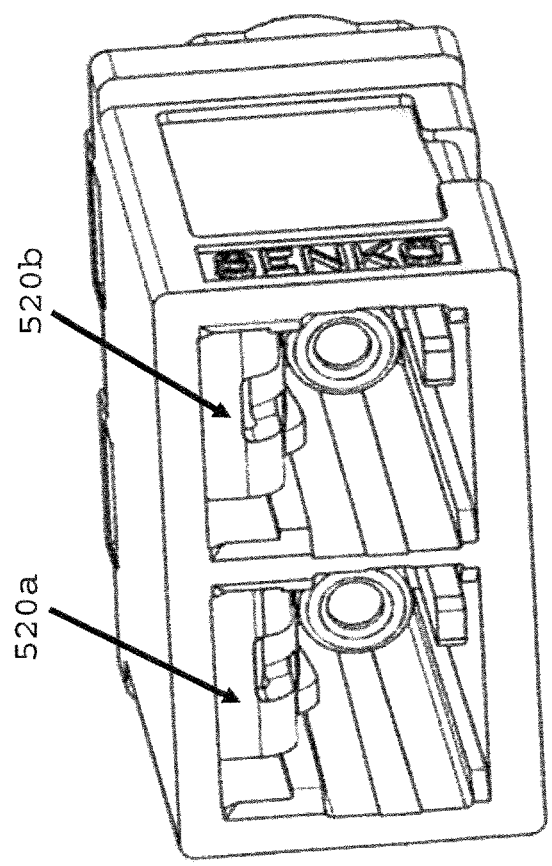
FIG. 10A is a front perspective angled view of a first body portion of the multi-body adapter of FIG. 2A.

Referring to FIG. 10A, adapter 200 shows engagement devices (520a, 520b) in respective receptacles at first end 938a. FIG. 10B is a rear view of second end 938b of second body portion showing corresponding structure that can mate with connector 140. FIG. 11A depicts front view of adapter 200 showing gap 113 (also refer to FIG. 2B.1) as extra space within adapter housing when using integrated adapter devices (220a, 220b), and cross section along C-C' depicted in FIGS. 12-13B. The additional space maybe used to increase material thickness to improve adapter durability, or reduce adapter size to correspond to future size reductions in connectors.

Figure 11B:
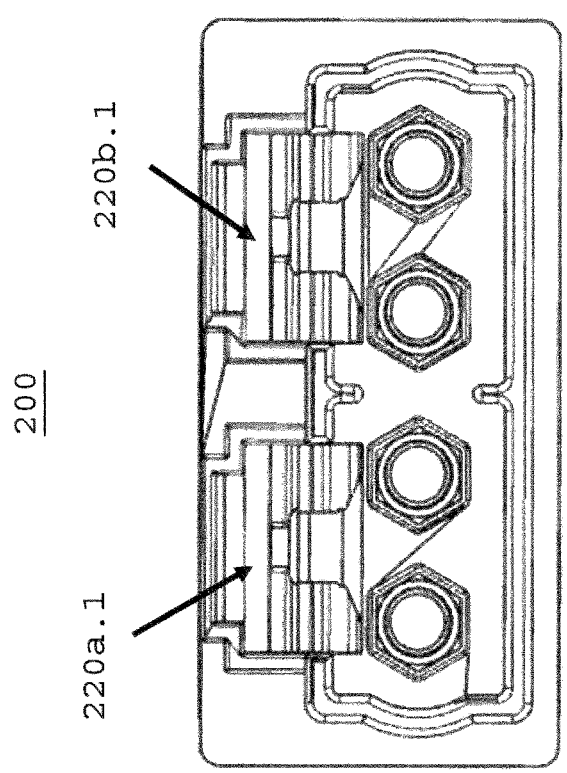
FIG. 11B is a rear perspective view of a second body portion of the multi-body portion of FIG. 2A.
Figure 11A:
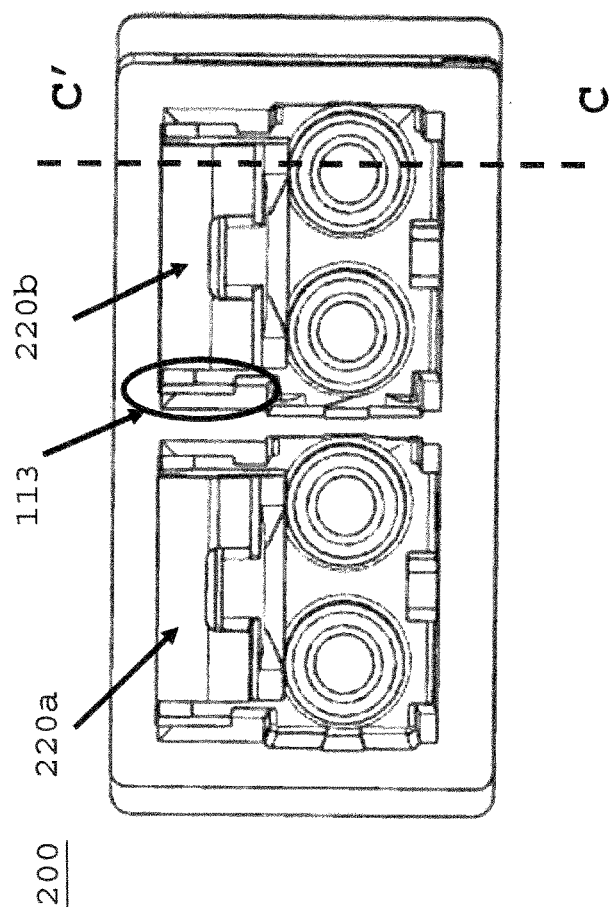
FIG. 11A is a front perspective view of a first body portion of the multi-body adapter of FIG. 2A with a cross section plane at C-C'.
Figure 12:
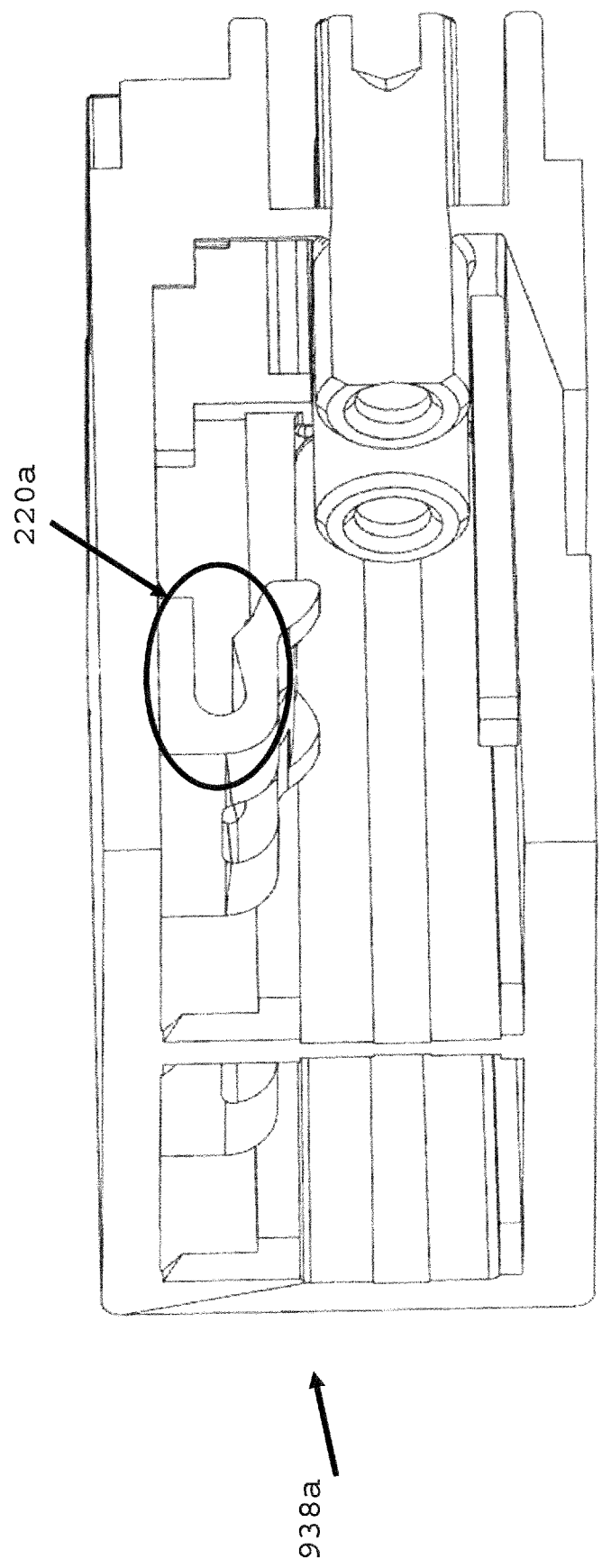
FIG. 12 is a cross-sectional perspective angled front view along plane C-C' of FIG. 11A.
Figure 13B:
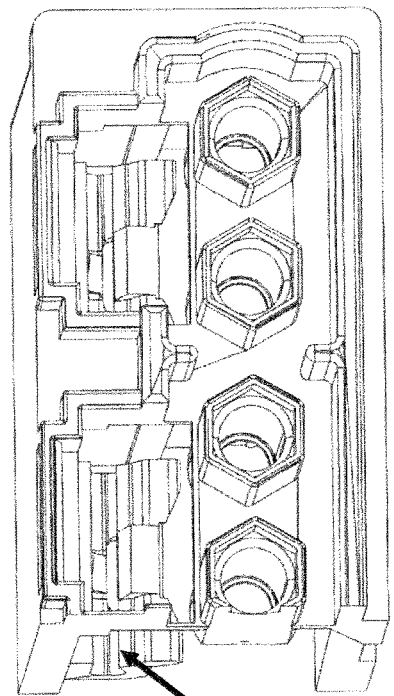
FIG. 13B is a rear view of cross-sectional view along plane C-C' of FIG. 11A.
Figure 13A:
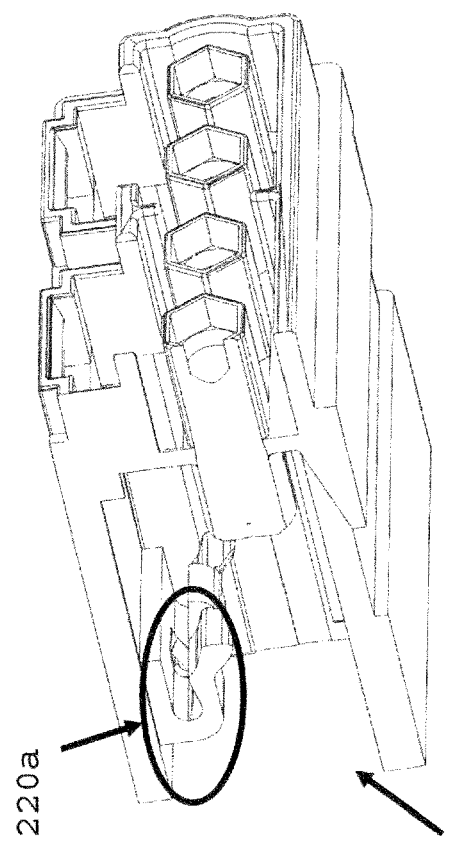
FIG. 13A is an angled cross-sectional rear view along plane C-C' of FIG. 11A.

FIG. 11B depicts a distal end of engagement devices (220a.1, 220b.1) as seen along longitudinal axis of adapter 200. The longitudinal axis is from a first end to a second end along bi-directional arrow "A" of FIG. 2A. FIG. 12 depicts engagement device 120 molded into adapter inner housing, as shown in call-out 220a, at first end 938a of first body portion. FIG. 13A depicts engagement device 220a molded into adapter housing as viewed from its distal end. FIG. 13B depicts engagement device molded into inner housing as viewed from backside of engagement device 220a.1 of adapter at second end 938b of adapter.

Figure 14:
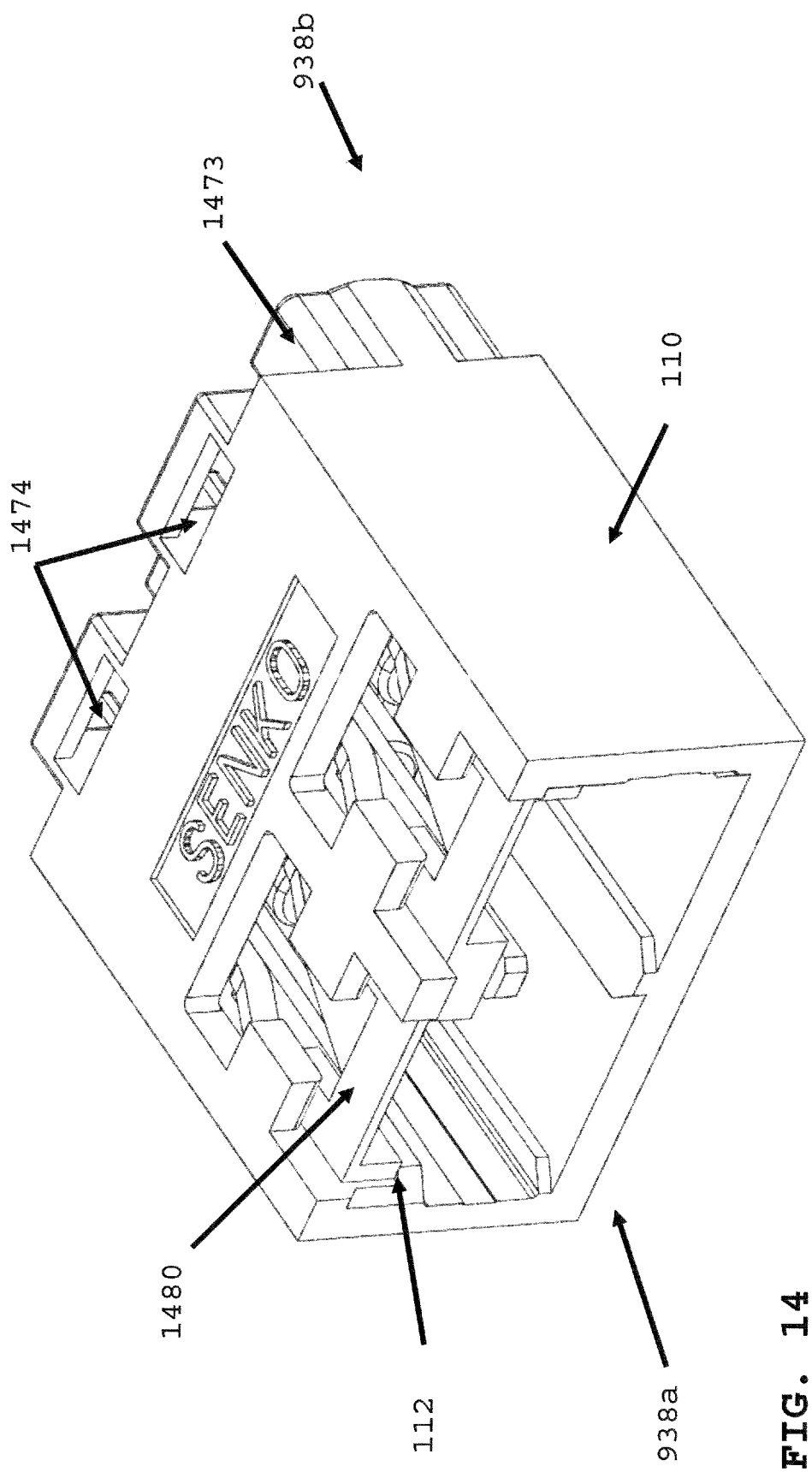
FIG. 14 is front perspective view of adapter with another embodiment of unitary engagement device therein.

FIG. 14 depicts a single housing adapter with a unitary engagement device removable and replaceable within first end 938a of adapter. Second end 938b is configured to accept connector 140, with latch 142 being accepted into openings 1474 to secure connector with shroud 1473, thereby establishing a communication path from a second end to a first end of adapter. Without departing from the scope of the invention, first end 938a can be configured to accept the unitary device 1480, while the second end is configured to accept connector 130. Also, first end and second end can both accept unitary device 1480, as shown in FIG. 8B that has engagement device (220a, 220b), molded as part of adapter inner housing at either end of adapter.

Figure 16A:
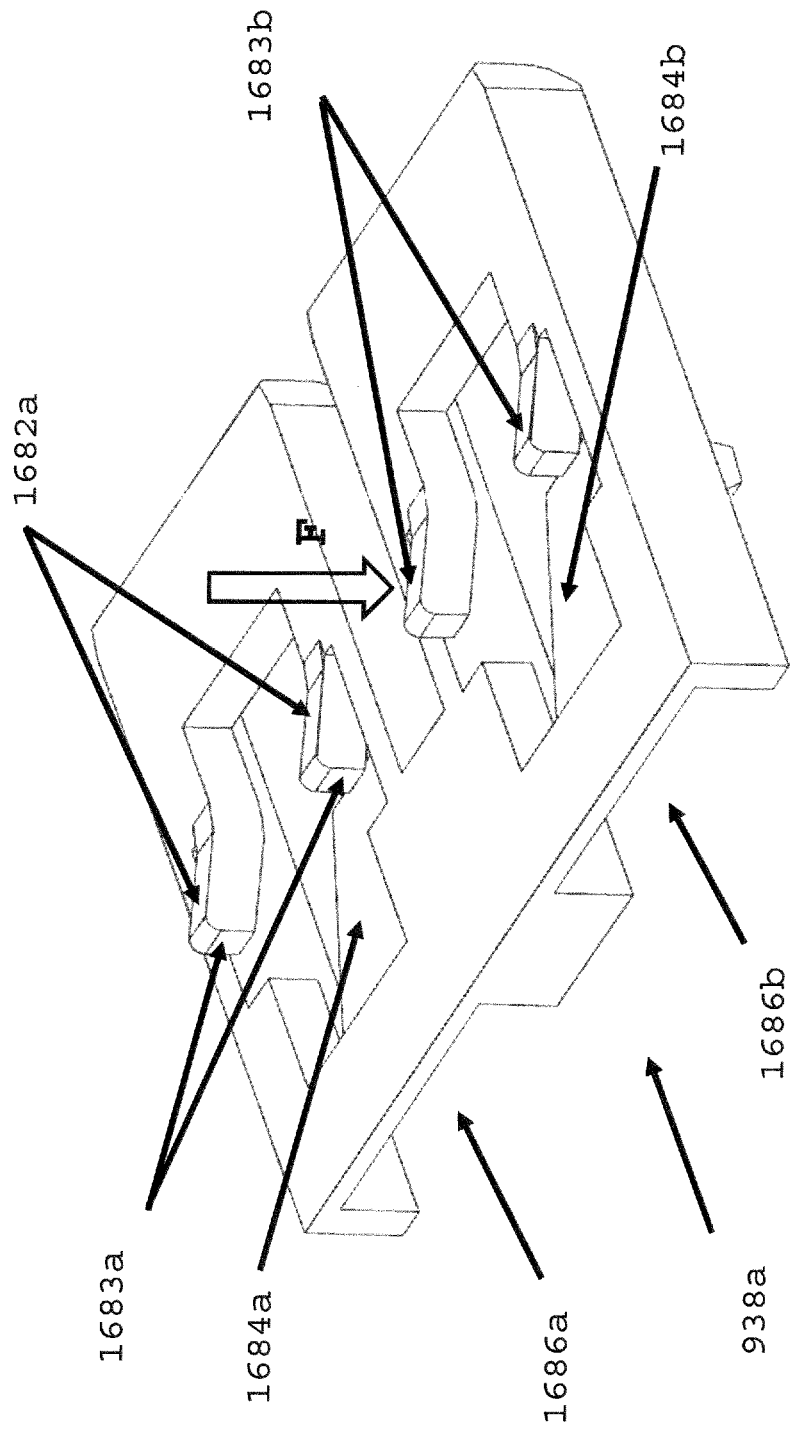
FIG. 16A is a perspective view of the engagement device of FIG. 15A showing operation of protrusions under a force "F" created by insertion into an adapter receptacle.
Figure 16B:
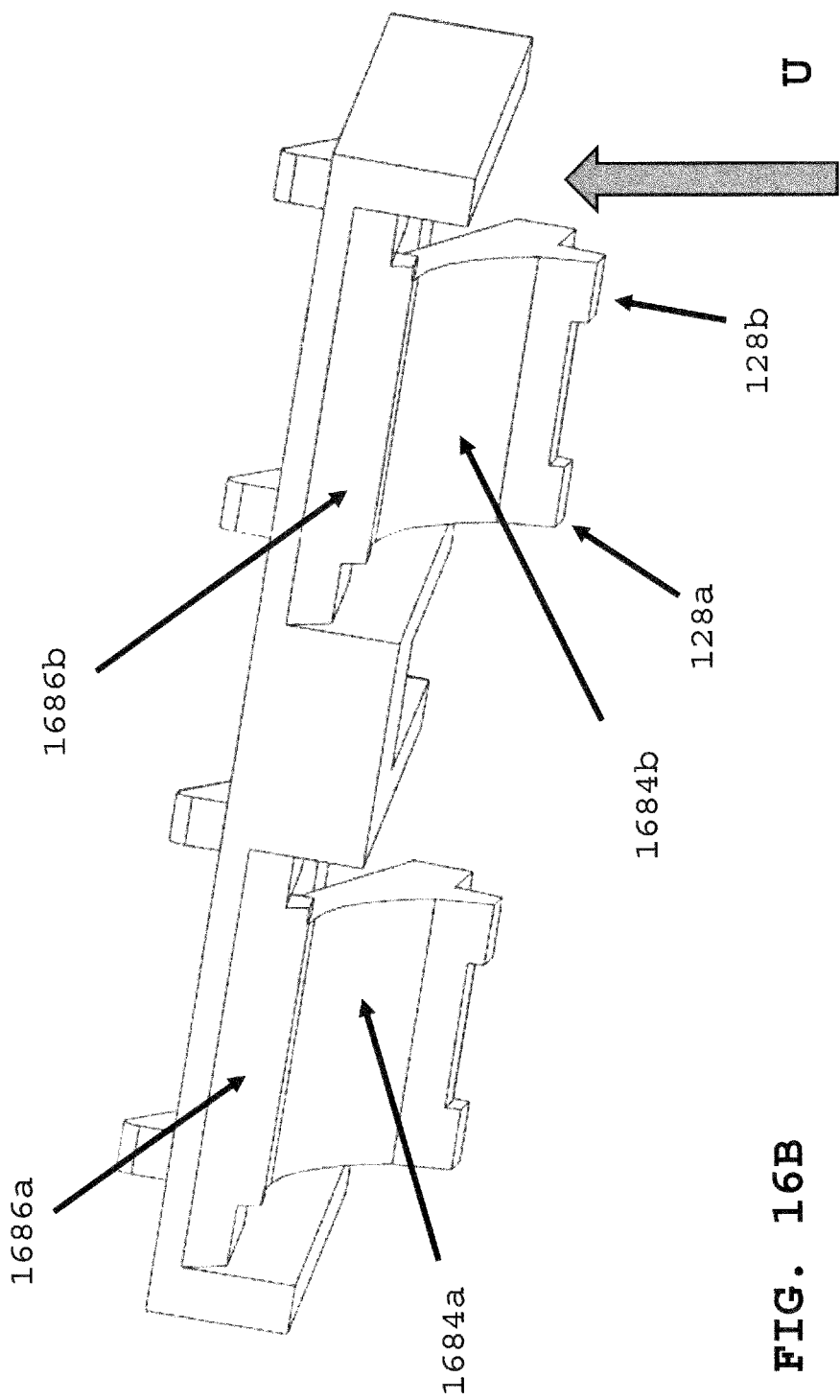
FIG. 16B is a perspective view of bottom of the engagement device of FIG. 15A.

FIG. 15A depicts unitary engagement device 1480 prior to insertion into a first end of adapter housing 1510 (refer to FIG. 15B). As with replaceable engagement device 102a, guide rails 129 are aligned with and accepted by rail support 112 within a receptacle, as shown by dotted arrow (refer to FIG. 15B). Referring to FIG. 16A, the unitary engagement device further comprises a plural of flexible latches (1683a, 1683b) for each engagement device. A single latch maybe provided to secure unitary device 1480 within an adapter receptacle. Upon insertion of unitary device 1480 into one end of adapter as shown in direction of arrow "A", FIG. 15A, face 1682a of latch pair 1683a engages adapter inner housing, and latches 1683a and 1683b are pushed down in arrow direction "F". Upon complete insertion, latch pair (1683a, 1683b) secures unitary engagement device via adapter housing openings (939a, 939b) respectively. Upon insertion of connector 130 into a receptacle of adapter, widthwise recess 132 accepts flexible tab (1684a or 1684b) and connector 130 is secured within a receptacle port. Proximal end of connector 130 is placed within openings (1686a, 1686b). Referring to FIG. 16B, connector 130 is inserted into opening 1686b. The proximal end raises flexible tab 1684b, and arms (128a, 128b) are seated in widthwise recess 132 to secure connector 130 within adapter. To release connector 130, push/pull tab is pulled rearward, and middle arm 125 lifts flexible tab upward, in direction of arrow "U", removing arms from widthwise recess 132, so connector 130 can be removed.

Figure 17:
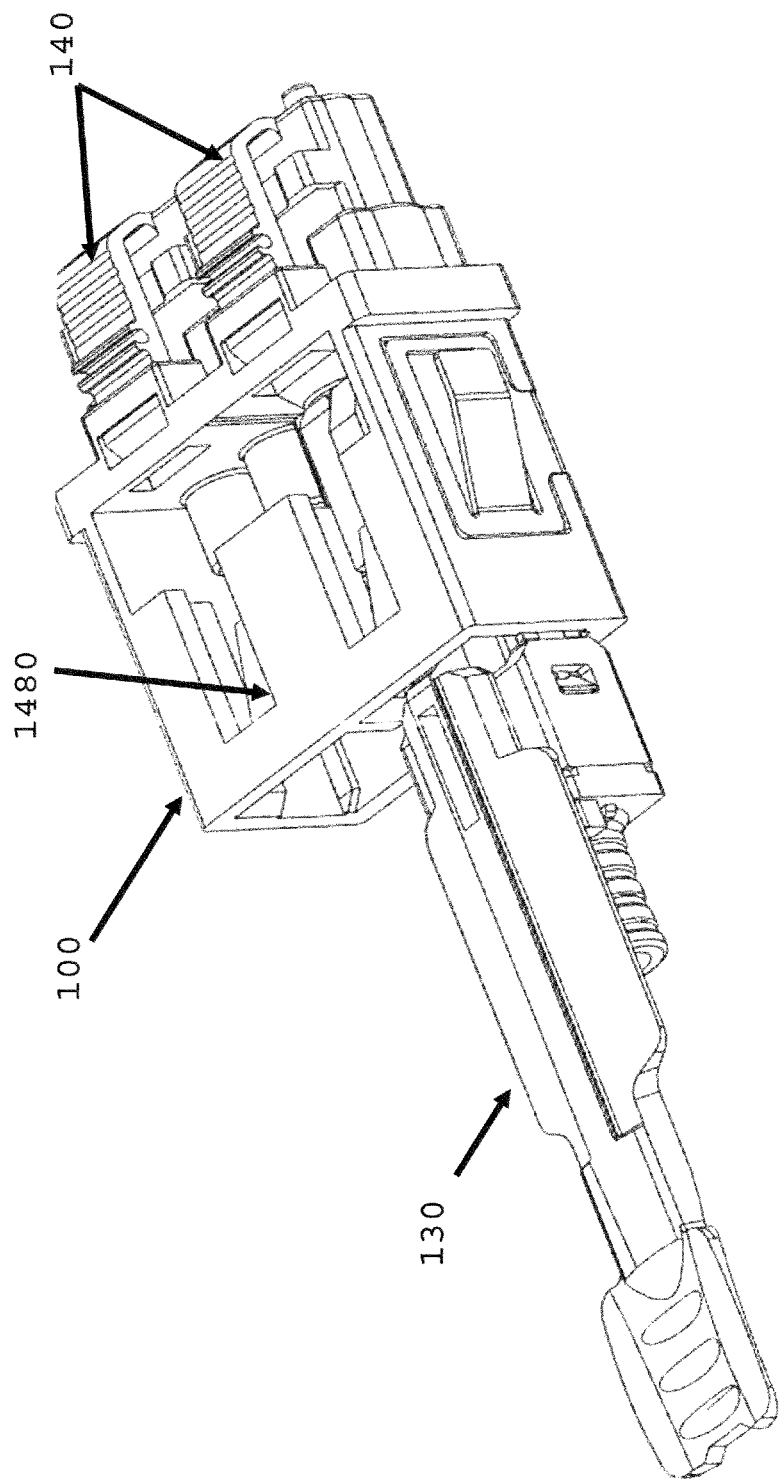
FIG. 17 is a perspective view of the adapter of FIG. 14 with engagement device of FIG. 16 at first end with a multi-fiber optic connector of FIG. 1E inserted at the first end and multi-fiber optic ferrule connector of FIG. 1F at a second end.

FIG. 17 depicts connector 130 secured in first end of adapter 100 and connector 140 secured in second end of adapter 100. A two-piece adapter 200 maybe used without departing from the scope of the invention. The unitary engagement device 1480 is inserted into a first end of first body portion, or a first end contains corresponding integrated engagement devices (220a, 220b).

FIG. 18 depicts another embodiment of an adapter 200 with housing 110 comprising one or more an integrated engagement device (220c-220f) molded into each receptacle port (124a-124d) of the adapter housing. Engagement device (220c-220f) is similar to engagement devices of FIGS. 1B-1C.1. Engagement devices (220c-220f) have two outer arms (128a, 128b) and middle arm 125 as described above in FIGS. 1B-1C.1. Although molded, as depicted in FIG. 18, the outer arms and middle aim operate as described above when a fiber optic connector 130, as depicted in FIG. 1E.1 is inserted into one of the receptacle ports (124a-124d). Operation of fiber optic connector 130 is described at FIG. 1E above. Referring to FIG. 18, adapter housing 110 further comprises front portion 250a and back portion 250b. As depicted front portion 250a has two or more receptacle ports (124a, 124b), however the front portion may have one receptacle port with an engagement device molded therein without departing from the scope of the invention.

Figure 19:
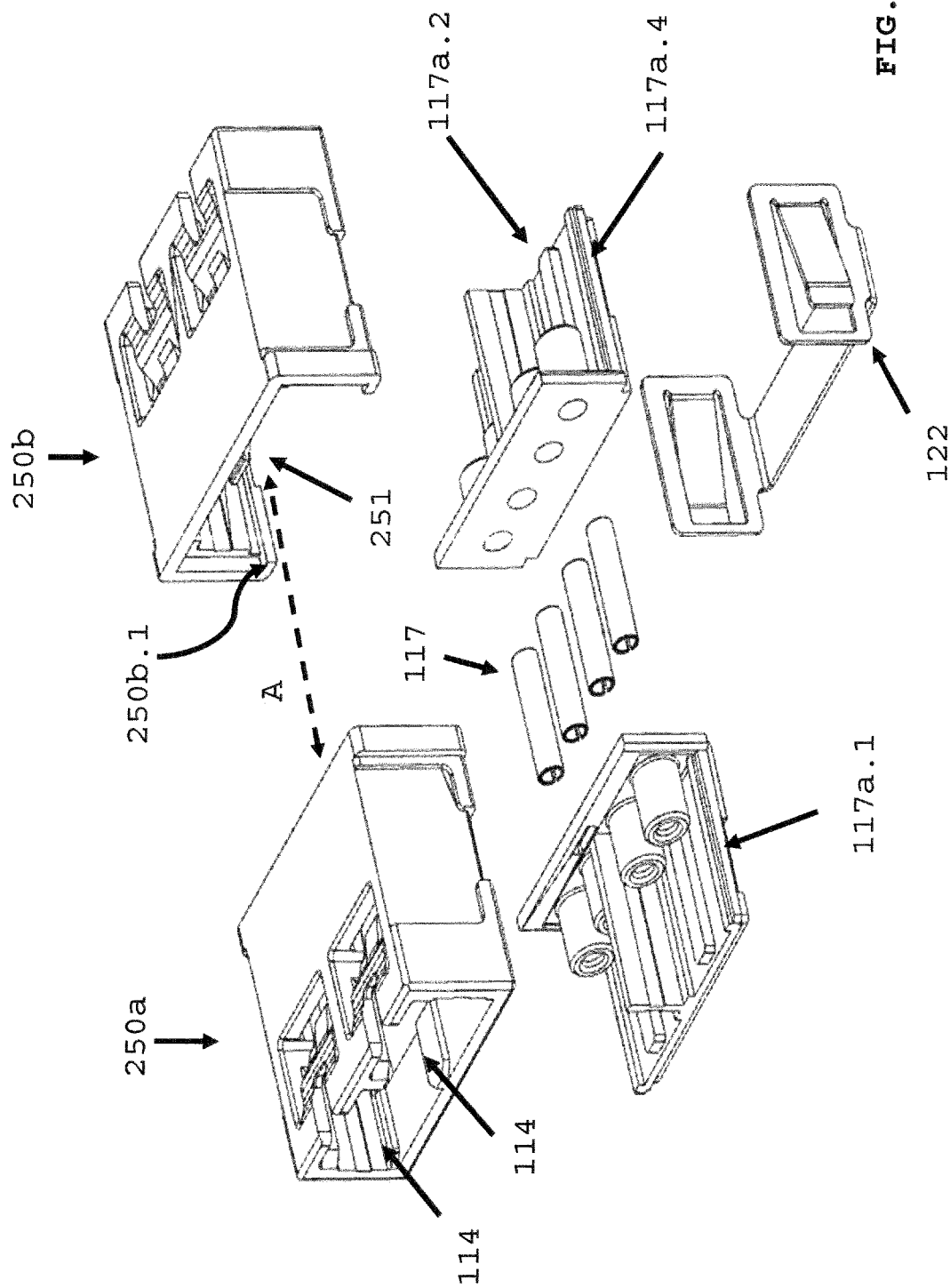
FIG. 19 is an exploded view of FIG. 18.
Figure 20:
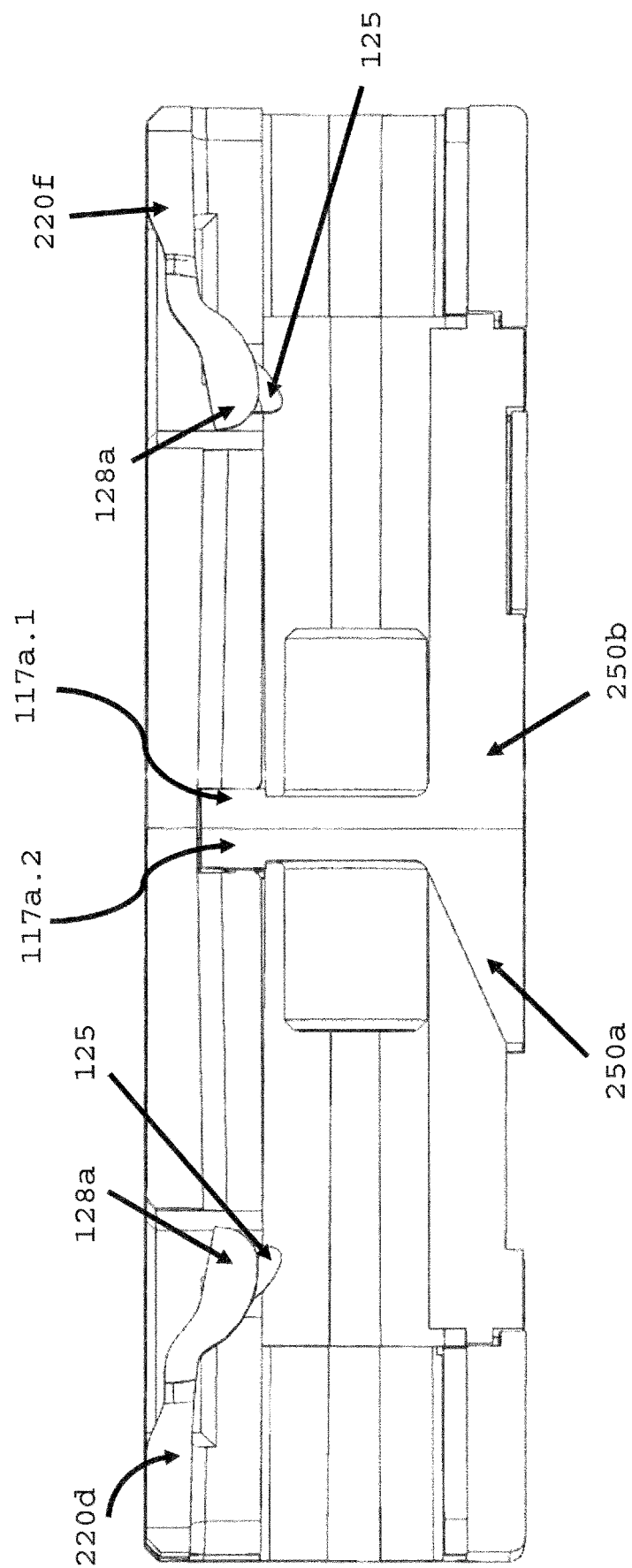
FIG. 20 is a cross-section view along A-A' of FIG. 18.

FIG. 19 depicts an exploded view of FIG. 18 adapter 200 with front body portion 250a offset from back body portion 250b. Back body portion 250b further comprises latch 251 that is secured into front body portion 250a along arrow A. Alignment sleeve holders (117a.1, 117a.2) according to a second embodiment, comprise alignment sleeve holder assembly 117a of FIG. 1D, molded as part of a bottom side of front body portion 250a and alignment sleeve holder assembly 117a.2 as part of bottom side of back body portion 250b. As described above alignment sleeves 117 interconnect front body portion 250a and back portion 250b thereby forming adapter 200. Alignment sleeve holder 117a.1 further comprises U-Channel surface 117a.4 lengthwise along an outer side of sleeve holder. U-Channel surface 117a.4 is accepted and supported by lip or ledge 250b.1 that runs lengthwise along a side of back body portion to form back portion as depicted in FIG. 20. Alignment sleeve holder 117a.2 is similar structure to 117a.1. Panel bracket 122 is secured about a recess in adapter housing for mounting the adapter within a patch panel as is known in the art.

FIG. 20 depicts cross-section of FIG. 18, along line A-A, with front body portion 250a and back portion 250b secured together with alignment sleeves. A portion of alignment sleeve 117 is secured within alignment sleeve holder 117a.1 and portion of alignment sleeve 117 is secured within alignment sleeve holder 117a.2 thereby securing front portion and back portion to form adapter 200. Still referring to FIG. 20, front body portion 250a shows molded engagement device 220d with outer arm 128a and middle arm 125. Middle arm 125 is slightly below outer arms 128a, 128b) and the arms are interconnected, and operate as described above in FIG. 1E. Likewise back body portion 250b shows engagement device 220f and outer arm 128a and middle arm 125.

Figure 21A:
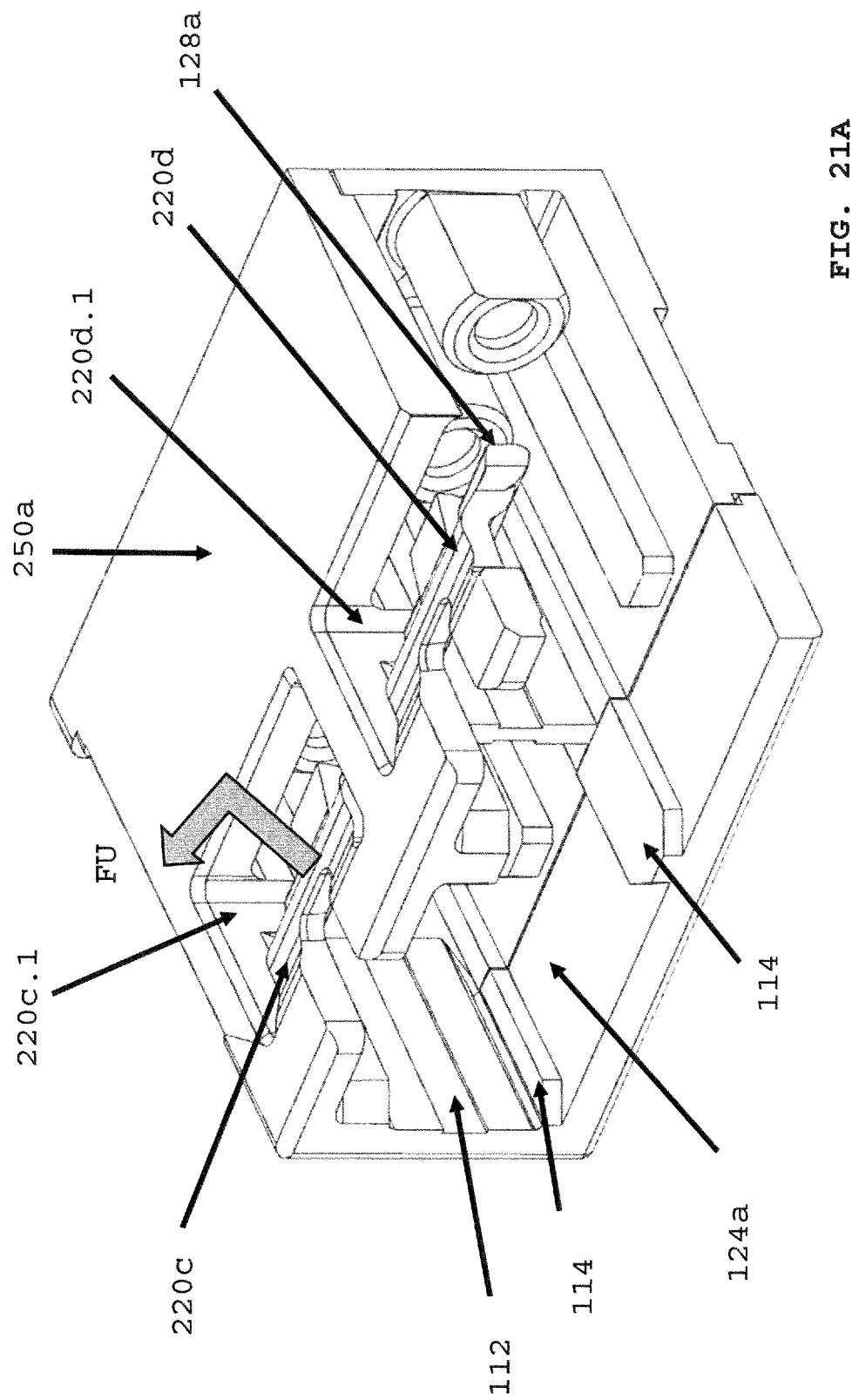
FIG. 21A is a front view of front body portion of FIG. 18 adapter with cut-away view at a receptacle port.

FIG. 21A depicts a cut-out view at receptacle port 124b of FIG. 18. In operation upon insertion of fiber optic connector 130 into receptacle port 124a, engagement device 220d rotates up or flexes up in direction of arrow "FU" into opening 220d.1 formed within adapter housing 110. Engagement device 220c also flexes into opening 220c.1, in direction of arrow "FU", upon insertion of a fiber optic connector within receptacle port 124a.

Figure 21B:
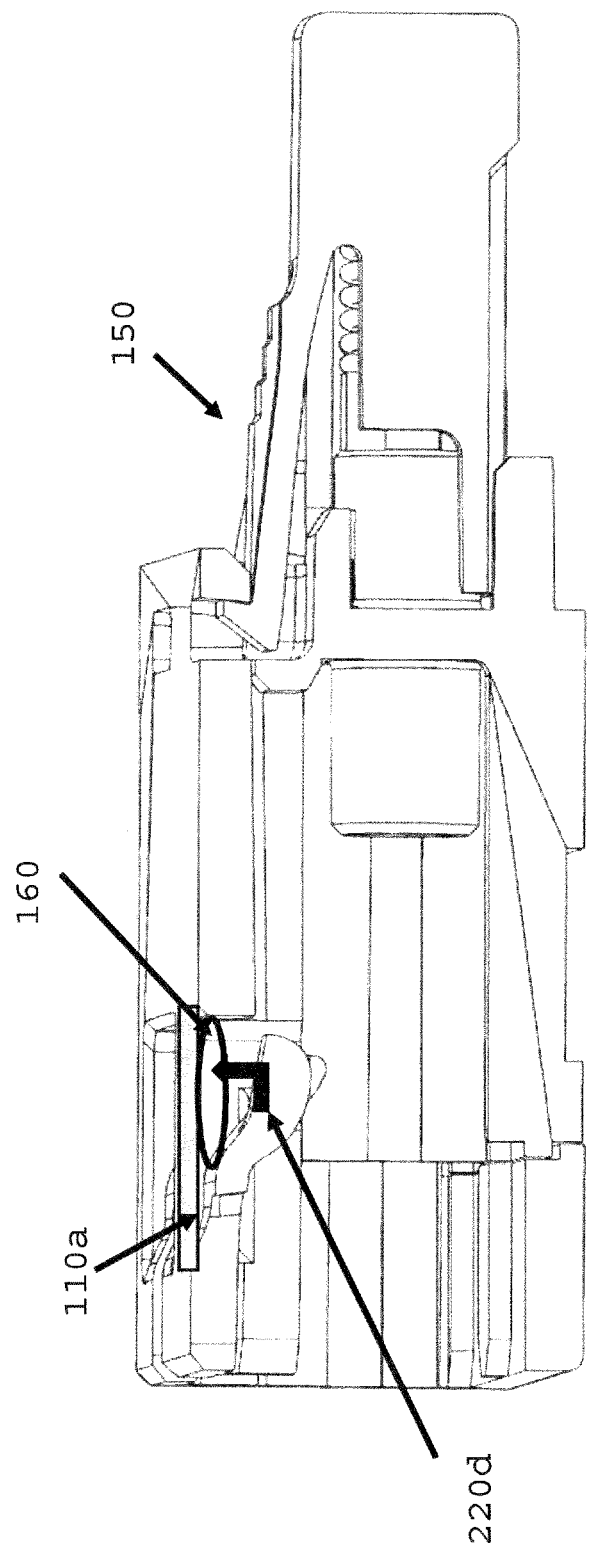
FIG. 21B is a front view of front body portion of FIG. 18 adapter with a closed housing and a gap to accept a flexed engagement device.

FIG. 21B depicts recess 160 within adapter inner housing whereby engagement device 220d flexes into upon insertion of fiber optic connector 150 into receptacle port 124b. A closed outer housing, 110a, reduces debris ingress into the adapter, which can interfere with the signal within the fiber optic connector emitting as light from an optical fiber embedded in the ferrule of the connector.

Figure 22:
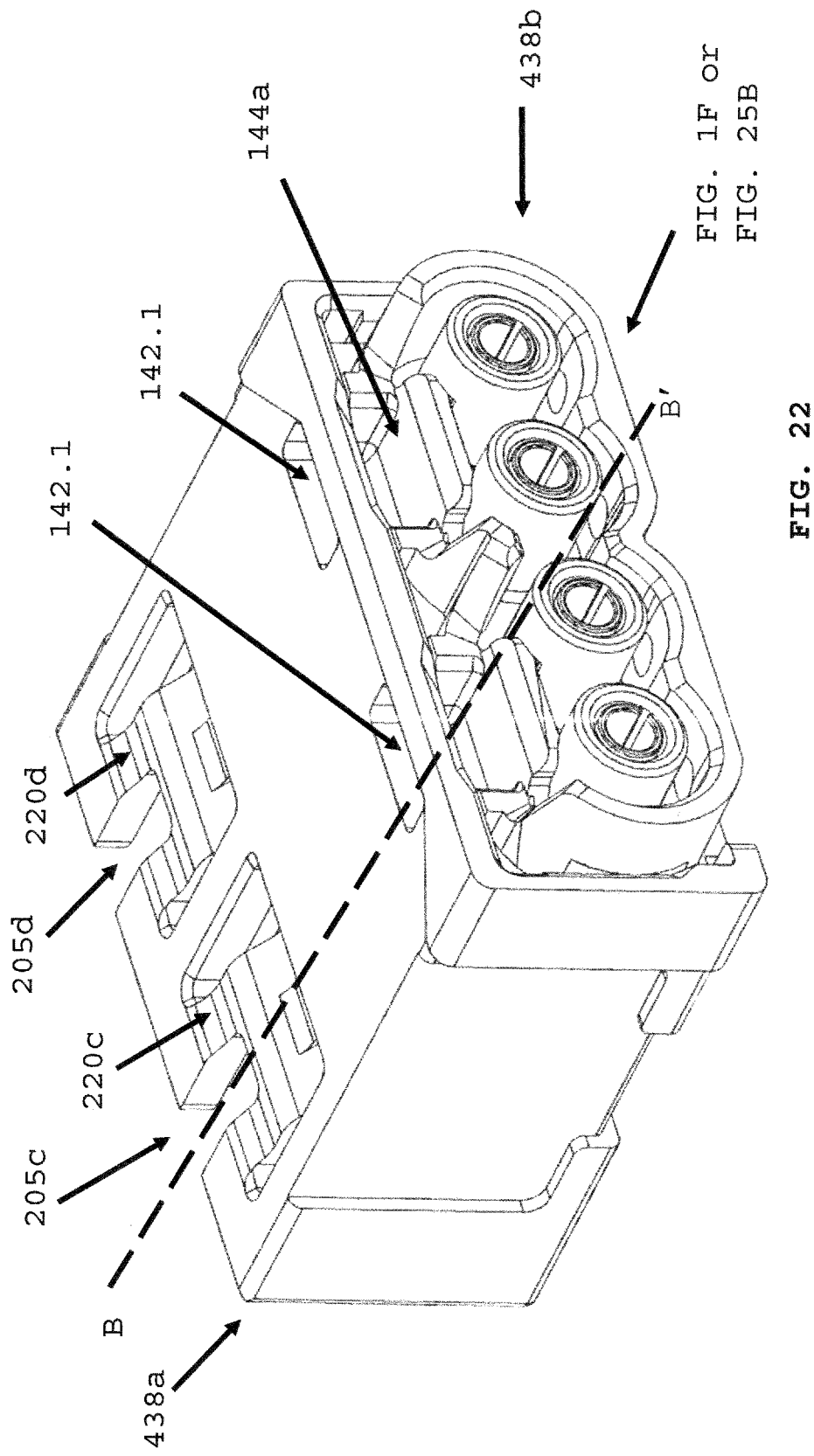
FIG. 22 is back-view of FIG. 18 front portion and back portion replaced with behind-the-wall receptacle ports.

FIG. 22 depicts an adapter with first end 438a comprising one or more engagement devices (220c, 220d) molded into a receptacle port, similar to front body portion 250a of FIG. 18, and alignment key slots (205c, 205d) that accepts a protrusion or alignment key on an outer surface of a fiber optic connector. The connector alignment key and key slots (205c, 205d) orient the fiber optic connector in the receptacle port. Second end 438b depicts a behind-the-wall receptacle ports with latch recess 142.1 that accepts latch 142 (refer to FIG. 25B) and latch receiving surface 144a that applies an opposite force to latch 142, to prevent latch 142 form being dislodged from recess 142.1 during normal operation.

Figure 23:
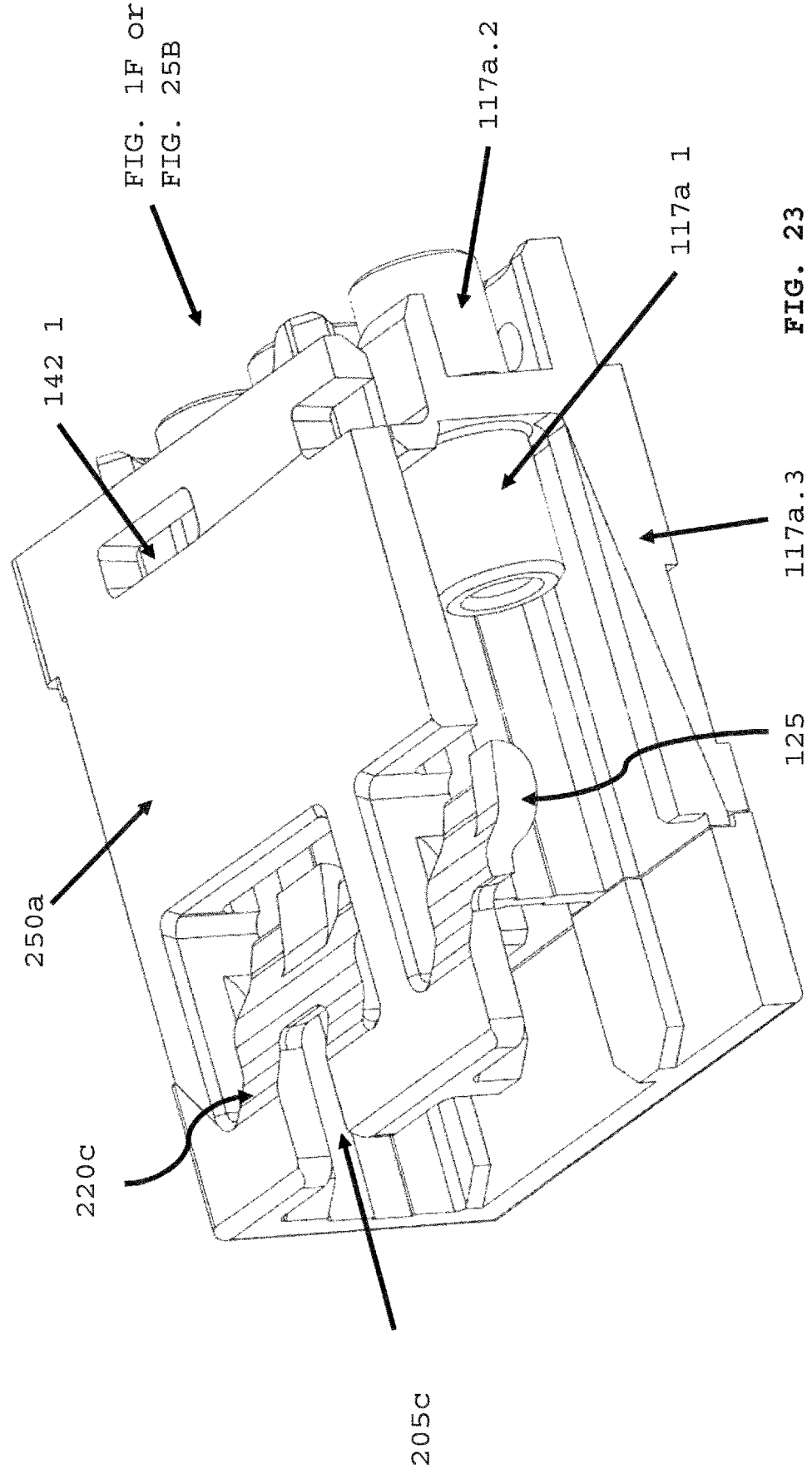
FIG. 23 is a side view with cut-out view of FIG. 22.

FIG. 23 depicts cut-out view along line B-B' of the adapter of FIG. 22, along first end 438a and second end 438b. First end 438a depicts FIG. 18 with integrated engagement devices (220c, 220d) molded into each respective receptacle port. Second end 438b depicts another embodiment of alignment sleeve holder 117a.3 but is a molded one-piece instead of two separate alignment sleeve holders (117a.1, 117a.2) molded together. Alignment sleeve holders (117a.1, 117a.2) are molded as part of alignment sleeve holder body 117a.3. Second end 438b can accept a fiber optic connector of FIG. 1F or FIG. 25B, with their respective latch 142 secured within latch recess 142.1 of adapter housing 110.

Figure 24:
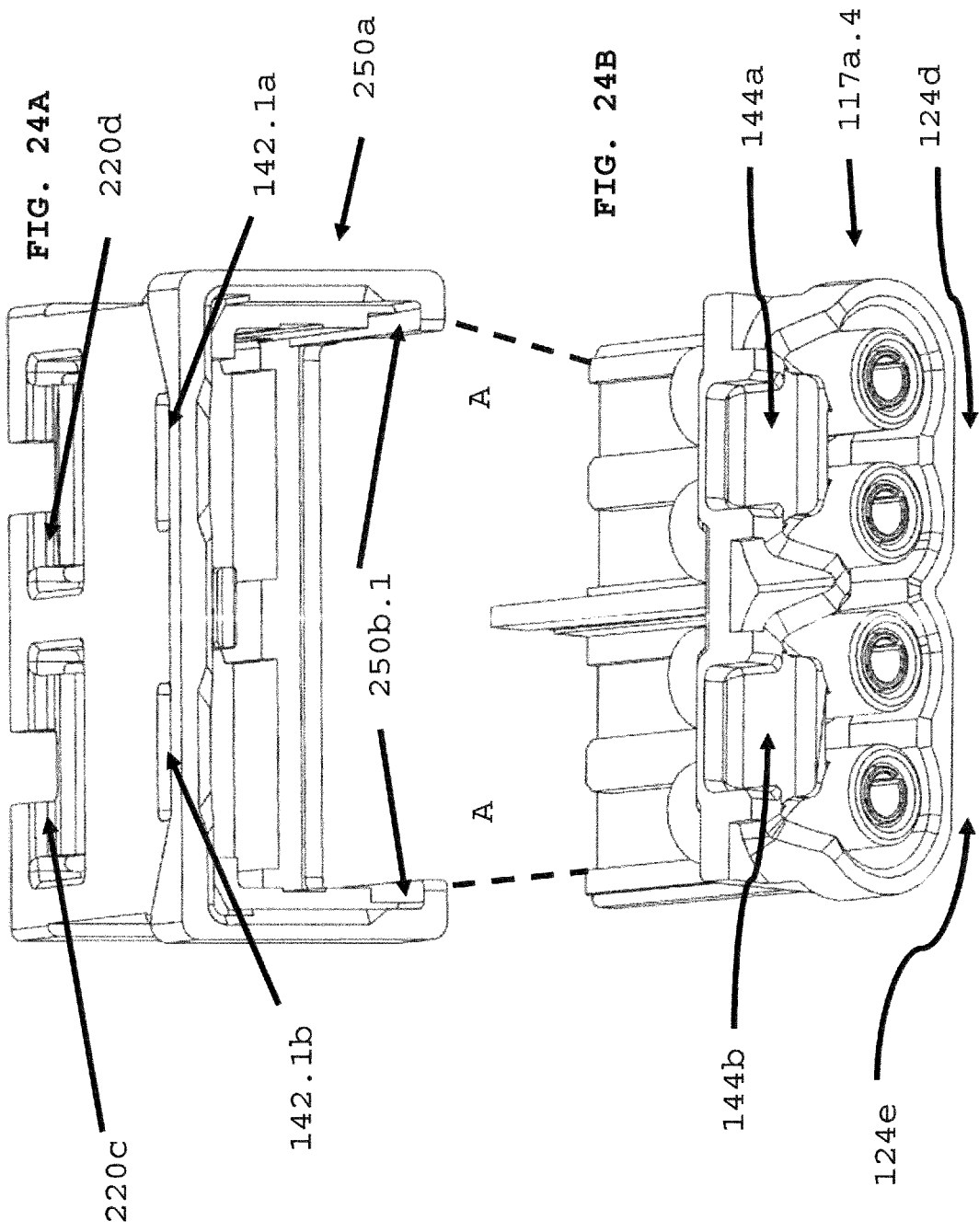
FIG. 24A is a perspective back view of back potion without the alignment sleeve assembly of FIG. 24B inserted therein.
FIG. 24B is a perspective view of an alignment sleeve assembly.

FIG. 24A depicts front body portion 250a end view configured to receive alignment sleeve holder 117a.4 where holder 117a.4 is secured and supported by lips/ledge 250b.1

Figure 25:
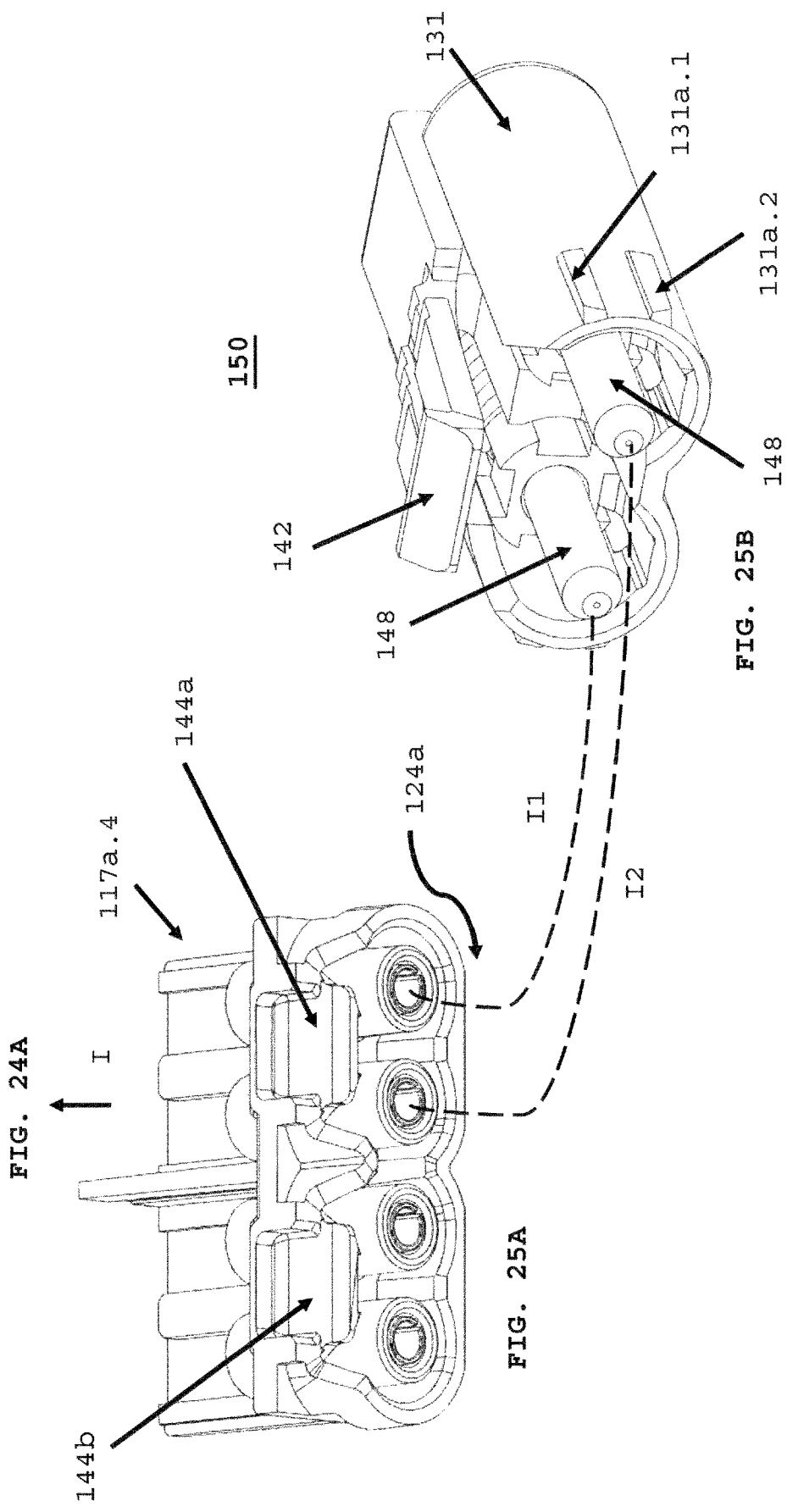
FIG. 25A is FIG. 25B.
FIG. 25B is a perspective view of a behind-the-wall connector similar of FIG. 1F.

(refer to FIG. 24A). Holder 117a.4 further comprises latch receiving surface 144a with applies an opposing force to bias latch 142 into recess latch 142.1a or recess latch 142.1b thereby securing fiber optic connector 150 of FIG. 25B within the receptacle port. FIG. 24B is alignment sleeve holder 117a.4 (refer to FIG. 25A) according to another embodiment of the present invention. In FIG. 24B, there are two receptacle ports (124d, 124e) configured to receive the connector of FIG. 25B. Connector 150 of FIG. 25B is received into either port (124d, 124e) and is used in tight spaces typically on racks of fiber optic connectors within a panel that is up against another panel of fiber optic connectors. Placing panels or racks of fiber optic connectors 150 in close proximity saves space, and for this reason fiber optic connector 150 is called a behind-the-wall connector.

FIG. 25A is a front view of FIG. 24B and accepts behind-the-wall connector 150 of FIG. 25B. FIG. 25B depicts fiber optic connector 150 with latch 142, as described above, outer housing 131 holding ferrule assembly 148 biased by spring 119 (refer to FIG. 26). In operation connector 150 is inserted into alignment sleeve holder 117a.4 of FIG. 25A along dotted lines I1, I2, and latch 142 is positioned on top of latch receiving surface 144a, while latch 142 extends through recess latch 142.1a of FIG. 24A, thereby securing connector 150 within a receptacle port for example receptacle port 124a. Referring to FIG. 25B, connector 150 has two guide protrusions (131a.1, 131a.2) along outer housing 131 to guide and align connector 150 within alignment sleeve holder and prevent rotation to help ensure a low insertion loss.

Figure 26:
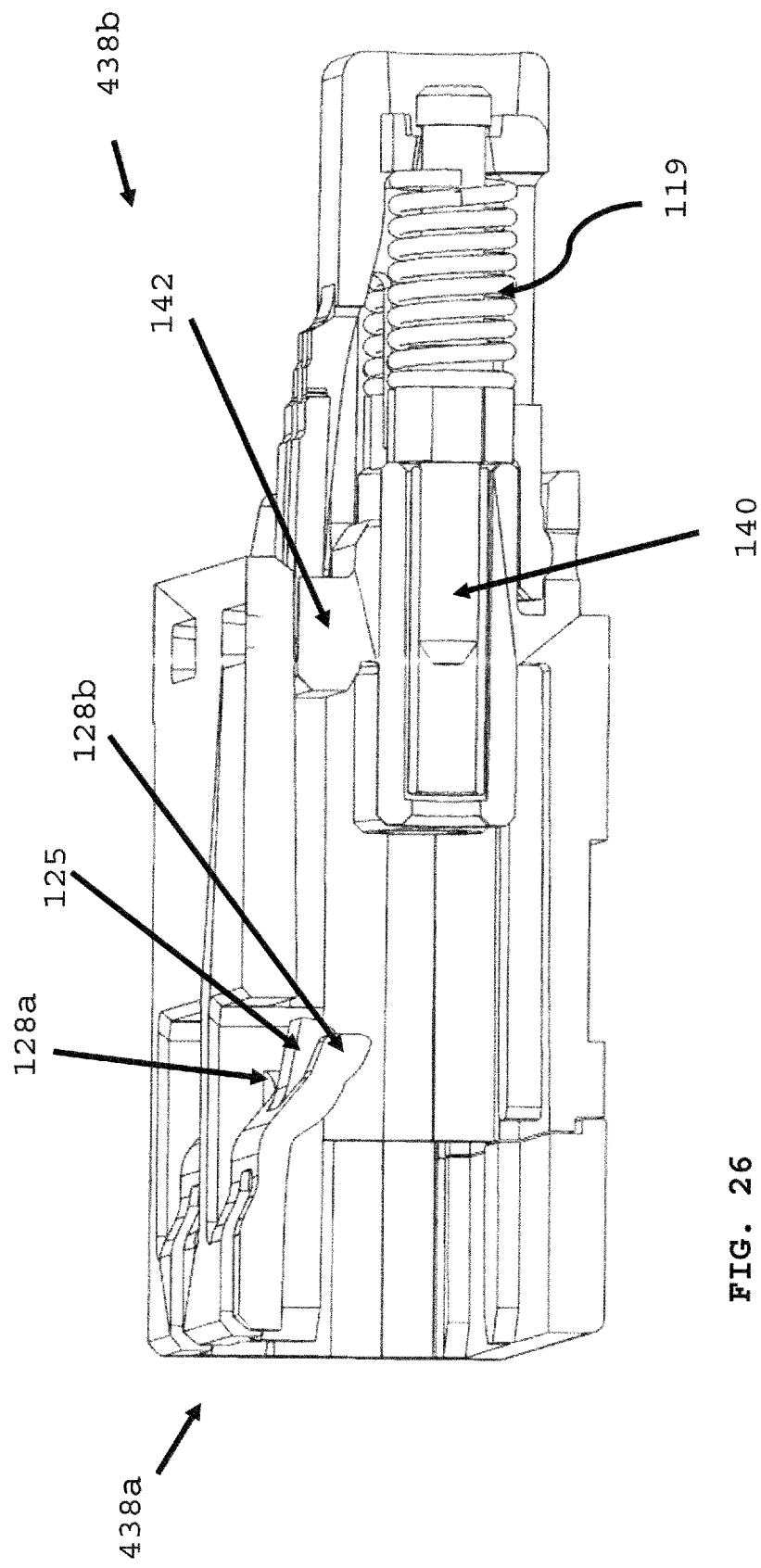
FIG. 26 is a cross-section of FIG. 25B inserted into FIG. 23 or FIG. 24B.

FIG. 26 depicts a cross-section along line B-B' of FIG. 22 with fiber optic connector 150 installed at second end 438b. First end 438a shows engagement device 220b comprising middle arm 125 and outer arm 128a ready to accept fiber optic connector 130. Second end 438b shows fiber optic connector 150 installed with spring 119 biasing ferrule assembly 148 forward within the receptacle port. Latch 142 is secured within latch recess 142.1.

Figure 27:
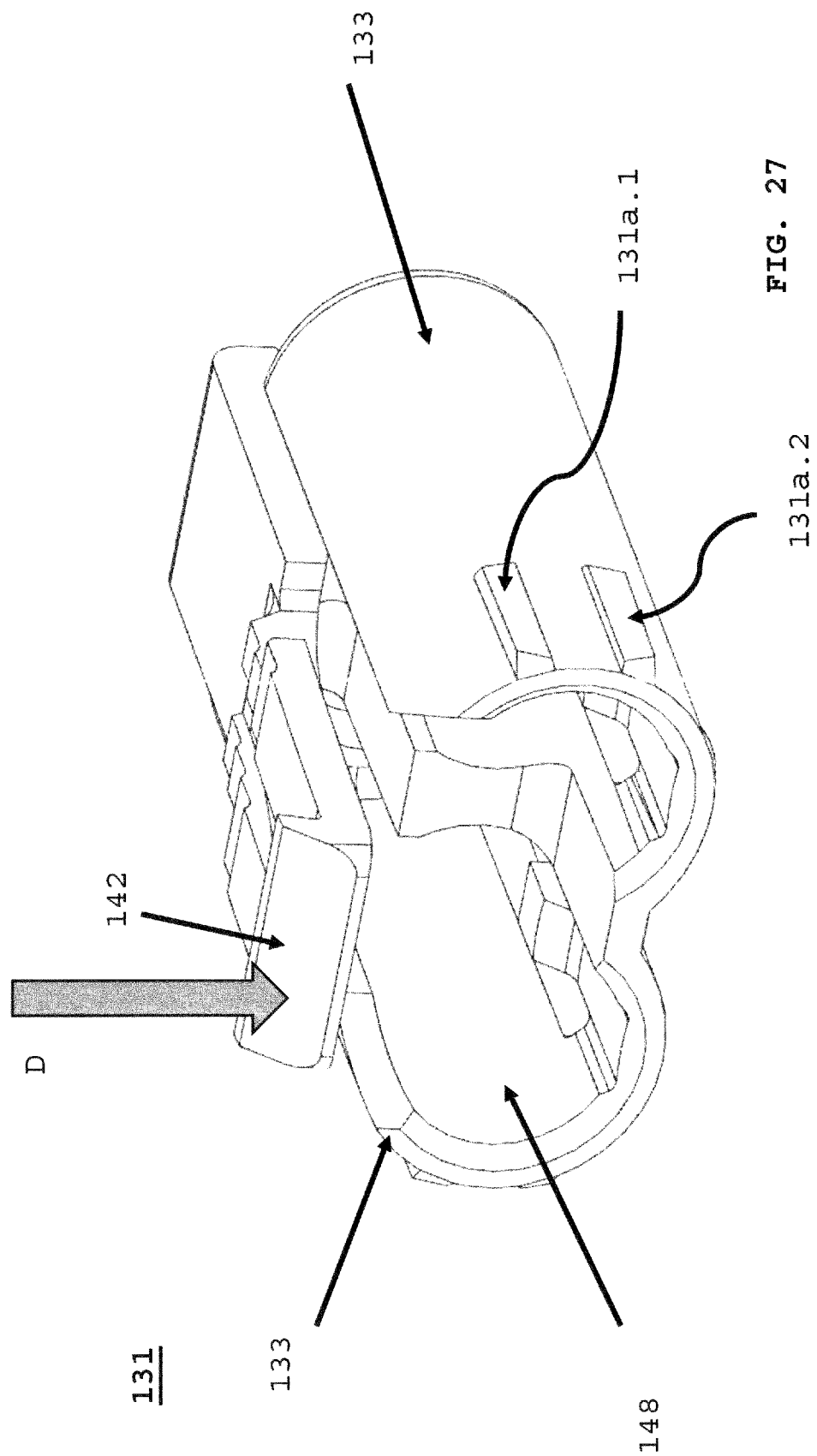
FIG. 27 is a perspective view of the outer housing of the connector of FIG. 25B.

FIG. 27 depicts outer housing 131 of fiber optic connector 150 with body portion 133 holding a ferrule assembly, and in this embodiment it is a two-ferrule housing. When connector is inserted into alignment sleeve holder receptacle latch 142 is depressed in direction of arrow D as shown in FIG. 27.

Without departing from the scope of the invention, a figure number 220 with a designation such as 220a, the figure number 220 is the element, in this case an integrated engagement device, while 220a is also an integrated engagement device but copy of duplicate demonstrating expansion of the invention. A designation of 220a.1 means a duplicate of an engagement device but on an opposite side of another 220a.2 engagement device, for example in FIG. 11B.

FIG. 28A depicts adapter 200 with fiber optic connector 160 inserted in a receptacle port at an opposing end from ports having integrated engagement devices configured to accept fiber optic connector 130. Fiber optic connector 160 has a body 161 with one or more ports 161a configured to accept a ferrule flange assembly 170 (refer to FIG. 29C). Referring to FIG. 29C, ferrule flange assembly 170 comprises a ferrule 170.1 with an optic fiber therein, a bias spring 170.2, a flange with a plural of protrusions 170.3 and a raised edge 170.4 at a distal end of the ferrule flange assembly.

FIG. 28B depicts adapter 200 with connector 160 within a receptacle port, the underside of receptacle port 201.1 contains one or more recess (201.1a, 201.1b) configured to receive corresponding protrusion (161.1, 161.2) on a bottom side of connector housing 161. When the protrusion 161.1 is accepted into recess 201.1a, fiber optic connector 160 is stabilized at the underside or bottom side from moving within the receptacle port of the adapter. Alignment sleeve holder 117.5 is an embodiment similar to FIG. 24B above. This helps prevent signal loss between the ferrule of the first connector and opposing second connector. Without departing from the scope of the invention, the protrusion maybe on the adapter side and the recess on the underside of the connector. FIG. 28C depicts alignment sleeve holder 117.5 within a port of adapter 200. Solid line "S" depicts protrusion 161.2 upon insertion of connector 160 (refer to FIG. 28C.1) in to alignment sleeve holder 117.5 port being accepted into recess 201.1a. Likewise for protrusion 161.1 into recess 201.1b. FIG. 28C.1 depicts fiber optic connector 160 with body 161 and one or more protrusions (161.1, 161.2) on underside or bottom side of housing 161. Housing 161 has one or more ports 161a that can accept ferrule flange assembly 170.

FIG. 29A depicts fiber optic connector 160 with ferrule flange alignment key (162a, 162b) positioned about each port of (161a, 161b) connector 160. FIG. 29B depicts a front view of ferrule flange assembly (170.1, 170.2) installed in ports (161a, 161b) respectively of connector housing 161. Ferrule flange alignment key (162a, 162b) is secured between two protrusions 170.3. This helps to prevent rotation of ferrule with an optical fiber therein when secured into an adapter port opposing another fiber optic connector. And further aids in front loading of ferrule assembly 170 into connector housing 161 port 161a or port 161b.

FIG. 30A depicts cut-out view of front end of fiber optic connector 160 after front loading ferrule assembly 170 into a port of connector housing 161. FIG. 30B depicts a ferrule flange retaining wing located at a distal end of housing 161 port. Wing 165 allows flange raised edge 170.4 to be inserted behind wing 165 shoulder when wing chamfer 165a expands when in contact with raised edge chamfer 170.4a. After wing chamfer is beyond wing 165, wing 165 relaxes and raised edge is secured behind wing 165, and the bias spring retains the ferrule assembly within connector housing 161 port.

An ordinarily skilled person in the art can appreciate that by following the principal of the present invention, a version of the adapter for mating a multi-fiber optic ferrule connector with another multi-fiber optic ferrule connector can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A fiber optic connector comprising:

a housing configured to accept at least one ferrule assembly, the housing having a ferrule flange holding wing about the inside of the housing at a distal end of the housing;

the ferrule flange assembly having ferrule flange with a raised edge about the distal end of the ferrule flange assembly and a plural of protrusions spaced about a proximal end of the ferrule flange assembly;

a bias spring positioned about a shaft between the plural of protrusions and the ferrule flange wing; and wherein the ferrule flange wing is positioned between the bias spring and raised edge of the ferrule flange thereby preventing the ferrule flange assembly from dislodging from the connector upon a front loading of the ferrule flange assembly into a port of the housing.

* * * * *